(12) United States Patent
Buurlage et al.

(10) Patent No.: US 11,839,522 B2
(45) Date of Patent: Dec. 12, 2023

(54) DENTAL IMPLANT HAVING A SOCKET BODY, AND KIT FOR SAID DENTAL IMPLANT

(71) Applicant: MAXON INTERNATIONAL AG, Sachseln (CH)

(72) Inventors: Thorsten Buurlage, Gorxheimertal (DE); Dirk Zimmermann, Sexau (DE); Jochen Kullick, Emmendingen (DE)

(73) Assignee: MAXON INTERNATIONAL AG, Sachseln (CH)

( * ) Notice: Subject to any disclaimer, the term of this patent is extended or adjusted under 35 U.S.C. 154(b) by 858 days.

(21) Appl. No.: 16/324,841

(22) PCT Filed: Aug. 11, 2017

(86) PCT No.: PCT/IB2017/054918
§ 371 (c)(1),
(2) Date: Feb. 11, 2019

(87) PCT Pub. No.: WO2018/029652
PCT Pub. Date: Feb. 15, 2018

(65) Prior Publication Data
US 2019/0223986 A1 Jul. 25, 2019

(30) Foreign Application Priority Data
Aug. 12, 2016 (CH) .................... 01040/16

(51) Int. Cl.
*A61C 8/00* (2006.01)

(52) U.S. Cl.
CPC ............ *A61C 8/0012* (2013.01); *A61C 8/005* (2013.01); *A61C 8/0022* (2013.01);
(Continued)

(58) Field of Classification Search
CPC ..... A61C 8/0012; A61C 8/0022; A61C 8/005; A61C 8/0063; A61C 8/0066; A61C 8/0068
See application file for complete search history.

(56) References Cited

U.S. PATENT DOCUMENTS

| 5,733,122 A | 3/1998 | Gordon |
| 5,947,733 A * | 9/1999 | Sutter .................. A61C 8/0069 433/173 |

(Continued)

FOREIGN PATENT DOCUMENTS

| DE | 28 36 152 A1 | 2/1980 |
| DE | 44 43 051 A1 | 10/1996 |

(Continued)

OTHER PUBLICATIONS

International Search Report and Written Opinion for International Application No. PCT/IB2017/054918 dated Nov. 29, 2017.

*Primary Examiner* — Cris L. Rodriguez
*Assistant Examiner* — Drew S Folgmann
(74) *Attorney, Agent, or Firm* — Crowell & Moring LLP

(57) ABSTRACT

The present invention relates to a dental implant (100, 100', 500) and to a kit for said dental implant. In order to provide dental implants (100, 100', 500) which meet the general requirements for a successful implantation and use and which can be easily adapted to bone variations and implant offerings, it is proposed according to the invention that the dental implant (100, 100', 500) comprises a ceramic base body (130, 530), a ceramic abutment (120, 120', 520), a ceramic tooth structure (110), and/or a connector (1, 1', 1'', 5) for connecting of base body (130, 530), abutment (120, 120', 520) and/or tooth structure (110) to each other, and a bushing body (6), which is at least in a final assembly state (E) of the dental implant (100, 100', 500) received at least partly in the base body (130, 530), in the abutment (**120,
(Continued)

120', 520) and/or in the tooth structure (110) or surrounds the connector (1, 1', 1", 5) at least in sections.

20 Claims, 9 Drawing Sheets

(52) U.S. Cl.
CPC .......... *A61C 8/0063* (2013.01); *A61C 8/0066* (2013.01); *A61C 8/0068* (2013.01)

(56) References Cited

U.S. PATENT DOCUMENTS

| | | |
|---|---|---|
| 2008/0233538 A1 | 9/2008 | Hug et al. |
| 2013/0224689 A1* | 8/2013 | Ishiwata ............... A61C 8/0068 433/201.1 |
| 2013/0236855 A1* | 9/2013 | Bullis .................... A61K 6/818 433/201.1 |
| 2013/0304136 A1 | 11/2013 | Gourlaouen-Preissler et al. |
| 2015/0147724 A1* | 5/2015 | Staudenmann ...... A61C 8/0069 433/201.1 |

FOREIGN PATENT DOCUMENTS

| | | |
|---|---|---|
| DE | 20 2008 003 960 U1 | 5/2008 |
| EP | 0 083 028 A1 | 7/1983 |
| EP | 2 168 530 A1 | 3/2010 |
| EP | 2 878 280 A1 | 6/2015 |
| JP | 2010-148558 A | 7/2010 |
| JP | 2013-244216 | 12/2013 |
| JP | 2015-146927 A | 8/2015 |
| WO | WO 95/10246 | 4/1995 |
| WO | WO 2011/036268 A2 | 3/2011 |
| WO | WO 2015/168332 A2 | 11/2015 |
| WO | WO 2016/056123 A1 | 4/2016 |

* cited by examiner

DENTAL IMPLANT HAVING A SOCKET BODY, AND KIT FOR SAID DENTAL IMPLANT

This application claims the benefit under 35 U.S.C. § 371 of International Application No. PCT/IB2017/054918, filed Aug. 11, 2017, which claims the priority of Swiss Patent Application No. 1040/16, filed Aug. 12, 2016, which are incorporated by reference herein in their entirety.

The present invention lies in the field of dental implants. It relates to a dental implant with a bushing body and to a kit for such a dental implant.

TECHNOLOGICAL BACKGROUND

Dental implants may have a single piece and a multiple piece design. At present, multiple piece dental implants have become preferable to single piece implants, since multiple piece dental implants offer better adaptability and protection against undesirable discomforts during the healing process than single piece dental implants.

A large number of multiple piece dental implants known in the prior art have a three-piece design and thus comprise a base body to be installed in a jaw bone, an abutment to be secured on the base body, and a superstructure to be placed on the abutment. The base body, also known as the implant body, is meant to replace the tooth root and is usually cylindrical or conical in shape. Generally, the base body has a thread, by which the base body can be fastened by screwing into the jaw bone, thereby accomplishing a primary firmness in the jaw bone. While the base body and the abutment are embedded in the jaw or concealed by the superstructure, the latter lies free in the oral cavity and represents the actual tooth structure. The abutment, also known as the implant structure, serves as a kind of intermediate member between base body and superstructure and is usually screwed into and/or glued in the base body.

The base body should be made from the most bio-inert material possible, in order to be able to be used for the most part compatibly and free of complications to the patient and to prevent gum regression. Both the material and the structure of the base body should enable a high degree of osseointegration. These requirements for so-called biocompatibility as well as good periointegration also hold for the abutment and the superstructure. Mostly ceramics, especially zirconium oxide, have proven to be a material with advantageous processing qualities as well as good biocompatibility. As an alternative to ceramics, titanium is often used, but this does not have as good biocompatibility and periointegration as ceramics.

For the long-term success of an implantation, a reliable connection between abutment and base body sealed off against both bone and gum is critical. A defective connection between abutment and base body may result in loosening of the dental implant and damaging of the dental implant. Non-tight connections can allow bacteria to get into the implant, resulting in periimplantitis and thus possibly resulting inter alia in jaw bone loss. Moreover, forces occurring in the dentition place high demands on the material and construction thereof for a long-term success of implants. Thus, the implants must be able to absorb all forces occurring in the dentition without breaking, ripping, or becoming loose. Therefore, precisely where and how force is channeled into the individual components of the implant is important, both during installation and also throughout the lifetime of the dental implant.

Depending on the position of the dental implant to be used in the jaw and the bone available at the position, different implant types and in particular different lengths or sizes of the dental implants may be required. Because the suitable size of the dental implant will vary according to the jaw situation, series with components of different sizes are generally used, and, as mentioned above, they need to provide a reliable connection between abutment and base body for a good long-term success. Thus, the series may comprise for example several base bodies of different size, such as having lengths of 6, 8, 10, 12, 14 or 16 mm for different diameters of 3.3, 4.1 or 4.8 mm, for example, as well as various abutments, having a straight or angled configuration, and likewise being possibly available in different sizes.

In summary, dental implants must satisfy high demands on biocompatibility, tightness, application of force and system flexibility.

For example, the European patent application filed by the applicant with publication number EP 2 735 279 A1, the disclosure content of which is incorporated herein in its entirety by reference, describes a dental implant with a ceramic base body which can be anchored in a jaw bone and with an implant structure securable by means of a screw to the base body, wherein in an assembled state of the dental implant a threaded section of the screw engages with an internal thread formed in a blind hole of the base body.

The screw presses the implant structure against the base body. A positive-fitting engagement between the threaded section of the screw and the internal thread of the hole exists solely in a lower half of the base body, facing away from the implant structure, and extending across half the length of the base body.

Thus, according to EP 2 735 279 A1, mechanical stresses should be distributed homogeneously over the entire length of the base body. The internal thread, into which the stresses are channeled directly via the screw, is situated deep in the foot of the base body, relatively far away from the contact region between base body and implant structure. In order to achieve a reliable fastening of the base body to the implant structure by means of the screw, the length of the screw must be matched up with the length of the blind hole of the base body and a portion of the implant structure. Accordingly, different screws need to be provided in each case for dental implants of different lengths. The provision of different screws is not only costly, but also cumbersome in use, and thus it results in unwanted extra costs and expenditures.

PRESENTATION OF THE INVENTION

Therefore, it is an object of the invention to provide dental implants which satisfy the general requirements for a successful implantation and use, and which can be adapted at least more easily to bone variations and implant choice than the dental implants known from the prior art.

This problem is solved according to the invention by a dental implant with the features of independent claim 1, and a kit with the features of claim 15. Preferred embodiments of the invention are specified in the dependent claims and in the present disclosure.

In particular, the problem is solved by a dental implant comprising a ceramic base body, a ceramic abutment, a ceramic tooth structure, and/or a connector for connecting the base body, the abutment and/or the tooth structure to each other, and a bushing body, which is at least in a final assembly state of the dental implant received at least partly in the base body, in the abutment and/or in the tooth structure, and/or at least in sections surrounds the connector, respectively. The connector for example has a base thread, which is configured to engage with an internal thread of the base body. In this way, abutment and/or tooth structure can be fastened by means of a screw connection established by the connector to the base body.

Furthermore, the problem is solved by a kit for a dental implant according to the invention. The kit comprises at least one bushing body, which is configured to at least in a final assembly state of the dental implant be received at least partly in the base body, in the abutment and/or in the tooth structure, and/or to at least in sections surround the connector, respectively.

The solution according to the invention has the advantage over the prior art that the ceramic components of the dental implant, i.e., the base body and abutment, can be given properties with the aid of the bushing body that are not intrinsic to ceramics as such. Thus, the overall strength of the dental implant can be enhanced, and the material of the ceramic components can be spared. For example, the bushing body may help to absorb or dampen critical stresses, such as shear forces. Furthermore, the bushing body helps coordinate or combine diverse and different dental implant components with each other. The bushing body thus makes it easier to adapt a dental implant according to the invention to the particular conditions as well as the repair procedures on the dental implant, such as the replacement of individual components, especially the abutment and the tooth structure, where the abutment and/or the tooth structure may alternatively or additionally involve a temporary prosthesis, such as the head piece of a healing screw, or a gingiva former.

The solution according to the invention may be supplemented as desired and further improved by the following further embodiments, each of which is advantageous in itself, whereby the skilled person will easily recognize clearly and distinctly that device features of components of one dental implant according to the invention justify corresponding steps of methods according to the invention for the manufacture and use of a dental implant according to the invention and its components, and vice versa.

According to a first further embodiment it is provided that the bushing body and/or the connector are/is made at least in sections from a metal, a metal alloy, a plastic, and/or a carbon fiber material. Such materials, particularly metal and metal alloys, such as those made of titanium or steel, generally possess greater toughness than ceramic. Due to the increased toughness, these materials bring about a dampening and a protection of the ceramic components.

Due to the toughness introduced by the use of these materials and the protection of the ceramic components, wall thicknesses of the ceramics can be decreased as compared to the prior art, because the ceramic itself is subjected to less critical stresses, such as shear stresses. In this way, on the whole more slender dental implants can be produced than is possible according to the prior art. For example, a wall thickness of the bushing body can be 2.5/10 to 5/10 mm, while the wall thickness of the ceramic can be 4.5/10 to 5/10 mm, for example. In other words, a wall thickness of the bushing body can be from between 50 and 60% of the wall thickness of the ceramic to roughly the wall thickness of the ceramic.

According to a further embodiment, it is provided that the bushing body at least in the final assembly state engages at least partly in the base body and the abutment. Due to the simultaneous engaging with base body and abutment, the bushing body on the one hand helps in stabilizing the dental implant. On the other hand, the base body helps during the assembling of the dental implant in holding the abutment at least temporarily in a desired position on the base body and thus facilitate the assembly process.

According to a further embodiment, it is provided that the bushing body at least in the final assembly state protrudes beyond a contact surface formed on the base body, which is configured to rest against a contact surface of the abutment in the final assembly state. In this way, the bushing body helps in further stabilizing the dental implant. The contact surfaces of base body and abutment are protected by the portion of the bushing body protruding beyond the contact surface of the base body against unwanted force actions and against wrong positioning both before and after the installation. The abutment can be placed on the base body in the course of mounting the dental implant, with the bushing body engaging the abutment before the contact surfaces meet each other.

According to a further embodiment, it is provided that the abutment rests against the bushing body and/or the base body at least in the final assembly state. On the one hand, it can be assured in this way that the bushing body is received down to a desired depth of penetration in the base body and/or abutment. On the other hand, a simultaneous bearing of the abutment against bushing body and base body helps further enhance the stability of a dental implant according to the invention.

According to a further embodiment, it is provided that the bushing body has a substantially cylindrical inner circumferential surface. The cylindrical inner circumferential surface helps distribute as uniformly as possible forces acting from the connector on the bushing body along the inner circumference of the bushing body. Furthermore, the cylindrical inner circumferential surface favors a relative rotation movement between connector and bushing body. Such relative rotation movements occur in particular when the connector is screwed into the base body.

According to a further embodiment, it is provided that one inner diameter of the bushing body corresponds substantially to an outer diameter of at least one shaft segment of the connector. The shaft segment of the connector may thus serve for supporting the connector on its shaft segment as extensively as possible across its entire outer circumference in the bushing body. Advantageously, a clearance fit can be provided for this with the least possible play between shaft segment and inner circumferential surface of the bushing body or even a transition fit.

According to a further embodiment, it is provided that at least one positive-fit element is formed on an outer circumferential surface of the bushing body. Due to the positive-fit element, an orientation of the bushing body relative to the ceramic components can be established. Furthermore, the positive-fit element can help promote a transmission of force and/or torque between the bushing body and the ceramic components.

According to a further embodiment, it is provided that the at least one positive-fit element is provided with an inserting bevel at least sectionwise facing in an inserting direction, in which the bushing body can be inserted into the base body and/or the abutment. The inserting bevel helps install the bushing body properly in the base body and/or the abutment. In particular, the inserting bevel helps introduce the positive-fit element into a counter positive-fit element, such as a positive element or a negative element, which is complementary at least in a projection along the inserting direction to the positive-fit element and serves for establishing the base body, abutment and/or bushing body in a desired position, especially in a desired relative rotary position with respect to each other.

According to a further embodiment, it is provided that at least one positive element of the abutment is configured to interact in form fit with the base body and/or the bushing body. A positive-fit between the positive element and the base body helps determine and establish a relative position between abutment and base body. A positive-fit between abutment and bushing body helps determine and establish a relative position between abutment and bushing body.

According to a further embodiment, it is provided that at least one negative element of the base body is configured to interact in positive-fit with the abutment and/or the bushing body. Similar to the positive element, the negative element helps determine and establish relative positions between abutment and base body. In particular, relative rotary positions between the ceramic components on the one hand and the bushing body on the other hand can thus be defined and secured.

According to a further embodiment, it is provided that the bushing body is provided with at least one latching element, which is configured to engage with a counter latching element formed on the connector in order to connect the bushing body and the connector to each other captively, at least temporarily. For example, in this way the bushing body can be snapped onto the connector in that the element locks to the counter latching element and consequently prevents the bushing body from being loosened accidentally from the connector. Therefore, the counter latching element may be formed for example as a latching nose, which in the latched state engages with a recess, groove, or behind a shoulder formed at the connector. A plurality of latching noses can be formed on the bushing body and arranged in a wreath-shaped manner, in order to enable a preferably uniformly distributed latching of the bushing body on the connector.

According to a further embodiment, it is provided that the at least one latching element is formed on at least one lug, which protrudes from an upper edge section of a shell section of the bushing body. In other words, the latching element or a distal end of the lug is spaced away in an axial direction from the shell section and thus from its edge. For example, the latching element can be formed at the end of such a lug pointing away from the shell section and point in a radial direction of the dental implant toward a center axis of the dental implant. Thus, the latching element arranged on the lug can be easily deflected in the radial direction, so as to latch with a corresponding counter latching element when the connector is introduced for example in the inserting direction into the bushing body. Furthermore, the axial spacing from the edge of the shell surface helps prevent notch effects between the bushing body and a ceramic component of the dental implant respectively situated in the area of the edge of the shell surface.

According to a further embodiment, it is provided that a minimal width of the bushing body is smaller than an outer diameter of a base thread of the connector for screwing the connector into the base body. For example, the connector may at first be produced without a thread and then the bushing body can be pushed over the shaft segment of the connector. After this, at least the base thread or further desired threads or elements may be formed on the connector by altering its cross-section surface. For example, the threads can be formed on the connector by means of thread rollers by displacement of the material of the connector such that one diameter of the thread is larger, at least for a portion, than one diameter of the shaft segment. In this way, the bushing body can be held in captive manner on the connector. This is especially helpful when bushing body and connector are coordinated with each other for joint use as part of a kit for a dental implant according to the invention.

Moreover, the invention relates to a unitary connector for connecting an abutment of a dental implant to a base body of the dental implant, comprising a base section which can be inserted along an inserting direction into the base body and be fixed therein, and an abutment holding portion for holding the abutment on the base body, wherein the abutment holding portion provides at least two holding positions for the abutment that are spaced apart from each other along the inserting direction.

The invention further relates to a unitary connection system for dental implants comprising at least one unitary connector according to the invention. With the aid of the unitary connector, the unitary connector system can be used for many different sizes and different kinds of dental implants. Besides at least one unitary connector, the unitary connection system may further contain other elements, such as holding elements, auxiliary holding elements and tools and/or measuring implements interacting with these and/or with the unitary connector.

Generally, both the base body and the abutment have boreholes, which can receive the unitary connector, wherein in the assembled state of the dental implant, a lower region of the unitary connector is located in the base body and an upper region of the unitary connector is located in the abutment. Depending on the length of the base body as well as the abutment, the unitary connector may protrude from the abutment at the top. Preferably, the first end region can be connected to the base body when the unitary connector is inserted in the base body, preferably being firmly anchored. Optionally, the unitary connector may be glued into the base body or alternatively connected like a bayonet lock.

The unitary connector offers the advantage that, due to the changeable length, it can be used for dental implants of different size. In traditional solutions with conventional screws, on the other hand, the sizes or lengths of the component parts must be exactly coordinated with the screw, in order to assure a reliable connection of base body and abutment. Because the unitary connector of the invention provides at least two holding positions, it is able to be used both for different sizes of base body and different sizes of abutments. Thus, for example, a positive-fittingly sealed connection of the base body to the abutment can be achieved by the same unitary connector for entire series of dental implants, and it can advantageously be anchored as deep as possible in the base body. On the one hand, this helps assure a stable construction of the dental implant. On the other hand, due to increased variability as compared to the prior art, production costs for dental implants can be lowered and their application can be made easier.

Due to the operative connection of the second end region of the unitary connector to the abutment, the unitary connector can connect the base body to the abutment, preferably in force fitting and positive-fittingly sealed manner. The operative connection may be produced inter alia by positive-fit, force fitting and/or material bonding, inter alia also indirectly through a holding or connecting means, such as one in the shape of a sleeve. Positive-fit is to be understood in the context of the fabrication of the components of the dental implant known to the skilled person. Sealing is to be understood in the sense of the connection between the abutment and the base body as meaning that the contact surfaces between the base body and the abutment are so tight that, for example, no bacteria can get in between base body and abutment, which helps to prevent periimplantitis.

A unitary connector according to the invention can be used with special advantage for multiple piece ceramic dental implants, especially due to the sealing. In such dental implants, an inner space or cavity is generally formed between base body and abutment.

When the abutment is properly mounted on the base body, the inner space is hermetically sealed against jaw bone and gums. The unitary connector can therefore be received in the inner space, isolated from jaw bone and gums. Hence, the unitary connector may also be made from materials other than ceramic, such as stainless steel and/or titanium or others, without necessitating the making of swabs for the biocompatibility of the dental implant, because this is assured by the ceramic nature of the implant components enclosing the unitary connector.

The solution according to the invention can be combined as desired with the following further respectively advantageous embodiments of the invention and further improved.

According to a first further embodiment, the holding positions can be chosen in continuously variable manner. A continuously variable selectability of the holding positions allows many different base bodies and abutments to be joined together with the same type of unitary connector. The continuously variable selectability of the holding positions also helps in balancing out any manufacturing tolerances as well as deviations or irregularities during the implanting or constructing of the implant.

According to a further embodiment, it is proposed that the base section has a first external thread, which is configured so that it can be brought into engagement with an internal thread of the base body and which provides the at least two holding positions. Due to the external thread, the unitary connector can be easily screwed into the base body and thus be connected to it with a positive-fit as well as force fitting. The holding positions can be made continuously variably selectable along the external thread.

According to a further embodiment of a unitary connector according to the invention, it is proposed that a length of the first external thread measured parallel to the inserting direction substantially agrees with a length of the internal thread measured parallel to the inserting direction or at least is slightly less than the length of the internal thread. Thus, internal thread and external thread can be substantially entirely congruent. On the one hand, due to the dimensioning of the thread itself, this helps in providing a lower end stop for the unitary connector and thus in limiting its insertion path in the inserting direction. On the other hand, the positive-fit and force fitting connection between unitary connector and base body is precisely limited to the area of said thread and concentrated therein. Unnecessary thread turns and the material weakening which they cause are avoided.

According to a further embodiment of a unitary connector according to the invention, it is proposed that the unitary connector has a cylindrical shaft segment between the base section and the abutment holding portion. Thus, the unitary connector can be produced as a kind of stud bolt with a thread at either end. The shaft segment favors receiving of the unitary connector in both the base body and in the abutment with as little play as possible. Any transverse forces or torques can be transmitted by bearing surfaces dimensioned with as little play as possible or no play between shaft segment and base body on the one hand and between shaft segment and abutment on the other hand, which helps improve the robustness and longevity of the overall dental implant.

According to a further embodiment, the shaft segment has a larger diameter, at least for a portion, than the base section. In the area of the diameter change, an end stop, or a step shape can be formed, which helps limit an insertion path of the unitary connector in the inserting direction. Furthermore, this embodiment makes it possible to design a stable shaft segment, such that forces acting in the transverse direction or radially to the center axis of the shaft segment or unitary connector can be safely absorbed and carried away. By contrast, threads in the base section and in the abutment holding portion can be configured to receive tensile forces acting parallel to the inserting direction, which helps in optimizing the dimensions of the individual components of the dental implant. Furthermore, this embodiment affords the advantage that a contact between base section and the inner wall of the borehole of the base body when introducing the unitary connector into the borehole of the base body can be minimized. For example, in the case of a thread in the base section a contact between the thread and the inner wall of the borehole of the base body when introducing the unitary connector may result in damage, which may be especially critical for ceramic base bodies. Thus, due to a step shape, a guiding of the unitary connector by the shaft can be advantageously assured and disadvantageous damaging of the base body through contact of the inner wall with the base section can be minimized. Preferably, the borehole of the base body then has in the lower region a narrowed borehole corresponding to the first end region of the unitary connector, in which the base section of the unitary connector can engage or be inserted as flush as possible therewith.

According to a further embodiment, a holding element surrounding the abutment holding portion is provided, which is configured to interact with the abutment holding portion in order to hold the abutment. The holding element can be configured so as to be able to be secured or locked in the at least two holding positions on the unitary connector or to at least interact with the unitary connector such that it can absorb and transmit forces acting substantially parallel to the inserting direction from and to the unitary connector. Different holding elements can be combined with the same unitary connector in each case in order to be able to use it together with different base bodies and/or abutments.

According to a further embodiment of the unitary connector it is proposed that the holding element has at least one holding surface, pointing at least partly against the inserting direction, for the holding of the abutment. The holding surface may be configured according to the particular requirements, so as to transmit forces acting substantially parallel to the inserting direction. The configuration of the holding surface may be optimized for the particular base body or the particular abutment.

According to a further embodiment of the unitary connector it is proposed that the abutment holding portion is provided with at least one holding thread for positive-fitting and force fitting interaction with the holding element. Thus, the holding element may be simply screwed on the holding thread on the unitary connector. The holding element is provided with a corresponding thread, configured complementary to the holding thread. This makes it possible to provide a variety of for the most part freely variably selectable and adjustable holding positions. Once the unitary connector has been properly inserted into the base body, the abutment may be easily secured in the desired position on the base body with the aid of the holding element by screwing the holding element with an appropriate torque onto the holding thread of the unitary connector. Thus, advantageously, manufacturing and assembly tolerances can also be balanced out, especially those occurring in the region of the base section or the connection between base body and unitary connector, and the best possible flush, stable and sealed connection between abutment and base body can be created.

According to a further embodiment, the holding element is sleeve-shaped with a substantially cylindrical outer contour. By such a sleeve, the unitary connector can be connected in simple and effective manner to the abutment for the positive-fittingly sealed connection of the abutment and the base body. In one advantageous embodiment, the sleeve is pushed across in engagement with the abutment holding portion and upon engaging it presses the abutment in positive-fittingly sealing manner against the base body. Pushing in this context will be understood by the skilled person as meaning not only a transverse sliding movement, but a positioning in general, where one component is received in or on another one. Pushing may therefore also comprise screwing or represent a combination between transverse sliding movement and screwing, for example when the sleeve is first pushed onto the abutment holding portion and, after engaging with it, is screwed into a holding thread provided on it.

Generally, the sleeve can be introduced into a sleeve mounting region of the borehole of the abutment and is configured to terminate flush with it. In one embodiment, a length of the sleeve measured substantially parallel to the insert direction amounts to at least 50%, preferably at least 75%, especially preferably at least 85%, of the length of a sleeve mounting region of the through-hole of the abutment, likewise measured substantially parallel to the insert direction. In an alternative embodiment, the sleeve may also be longer than the sleeve mounting region of the through-hole of the abutment. Then the sleeve protrudes beyond the abutment, creating additional stability.

According to a further embodiment, at least one auxiliary holding element is provided, surrounding the abutment holding portion and configured to interact with the abutment holding portion for the holding of the abutment. The auxiliary holding element may serve for lengthening the holding element or its active region, or for stabilizing or countering it. In particular, the auxiliary holding element may provide supporting functions in addition to the holding element. Thus, the auxiliary holding element helps employ the unitary connector even more flexibly in connection with different base bodies and/or abutments.

For designs with abutments having a borehole with a holding element or sleeve mounting region that is significantly longer (e.g., more than twice as long) as the holding element, an auxiliary holding element affords the advantage that, after inserting the holding element, the remaining gap between the abutment holding portion and the inner wall of the holding element or sleeve mounting region of the borehole of the abutment can be occupied by the auxiliary holding element. This can enhance the stability of the dental implant, since the supporting surface between abutment and unitary connector is enlarged.

According to a further embodiment, it is proposed that the holding element and/or the auxiliary holding element as a kind of round nut are/is provided with an internal thread. The internal thread is respectively complementary to the thread formed on the abutment holding portion. Hence, holding element and auxiliary holding element can be easily screwed onto the abutment holding portion.

According to a further embodiment, it is proposed that the holding element and/or the auxiliary holding element has/have an engaging means, against which a tool can be supported for operating the holding element and/or the auxiliary holding element. In particular, the engaging means may be complementary to a counter engaging means of a special tool, by which the holding element or the auxiliary holding element can be operated. For a holding element or auxiliary holding element which can be screwed onto the abutment holding portion, the engaging means is fashioned so that a torque for screwing on the holding element or the auxiliary holding element can be transferred to it. Engaging means in one embodiment can be grooves situated and formed at one end of the holding element or the auxiliary holding element, preferably axially symmetrical to it.

According to an additional embodiment, it is proposed that a length of the unitary connector measured substantially parallel to the inserting direction can be changed. This affords the advantage that the unitary connector can be shortened or lengthened for different sizes of dental implants with a length too large or too small for the unitary connector.

According to a further embodiment, it is proposed that the unitary connector is configured so that it can be cut to length at predetermined length markings, depending on the size of the dental implant. The length markings make it possible to cut the unitary connector precisely to the desired length before, during or after its installing. In particular, this affords the advantage that the unitary connector can be adapted for small dental implants, for which the base body is short, by shortening the length of the unitary connector. Preferably, the base section and/or the abutment holding portion is of sufficient length, so that after a shortening of the unitary connector the base section and/or the abutment holding portion still have a sufficient length to ensure a connection with the base body and/or an operative connection with the abutment.

According to a further embodiment, it is proposed that the length markings are formed as predetermined breaking points. The predetermined breaking points simplify precise cutting to length of the unitary connector and prevent unwanted damage in the cutting process. In embodiments in which the base section and/or the abutment holding portion have a thread, the thread advantageously extends along such a sufficient length of the inserting direction that even after shortening an adequate threaded piece remains to ensure a connection with the base body and/or with the abutment. In one especially advantageous embodiment, the abutment holding portion is longer than the base section. If the unitary connector is then cut to length in the region of the abutment holding portion, the base section and the base body will be unaffected by this.

According to a further embodiment, it is proposed that the abutment holding portion, and/or the base section are configured so that they can be brought into engagement with a connector extension, preferably in the form of a bolt extension or screw extension. Preferably, a bolt extension or screw extension can be provided for the lengthening, having an outer diameter matching up with the outer diameter of the unitary connector, so that no changes result with regard to the guiding of the abutment and/or a holding element and the radial positioning of the unitary connector in the through-hole of the abutment. In embodiments with an external thread in the base section and a holding thread in the abutment holding portion, the connector lengthening affords the advantage that the unitary connector can be lengthened as needed at both ends in flexible manner. In embodiments with a cylindrical shaft segment, the outer diameter of the round nut is advantageously equal to the outer diameter of the shaft segment, so that a continuous transition between shaft segment and the connector lengthening becomes possible. Furthermore, the unitary connector can be adapted or lengthened in the case of large dental implants with an otherwise too large a length for the unitary connector. Preferably, the bolt extension or screw extension has an outer diameter which agrees with the outer diameter of the unitary connector, so that no changes result with regard to the guiding of the unitary connector and the radial positioning in the borehole of the base body.

A unitary connector according to the invention along with any holding and/or lengthening elements may be reversible in a further embodiment, so that the function of base and abutment holding portion can be exchanged with each other in any desired way according to the particular requirements. The dimensions of base and abutment holding portion may be attuned to different base bodies or abutments, so that for example the base section is used for certain sizes and types of base body and the abutment holding portion is used therein for other sizes and types and therefore becomes the base holding section, while then performing the function of the abutment holding portion. The variability of the unitary connector can be enhanced by such a reversible function.

In the unitary connection system according to the invention, the solution of the invention can be further improved in that the unitary connection system furthermore comprises at least one base body which can be inserted into a jaw bone and/or at least one abutment holding portion which are configured to interact with the unitary connector. A base body insertable into a jaw bone, an abutment connectible by positive-fit with the base body, and a unitary connector according to the present disclosure make it possible to provide especially cost favorably flexible-usable series of dental implants having components which can be combined with each other in modular fashion.

According to a further embodiment of a unitary connection system according to the invention, it is proposed that the base body has a borehole for receiving the unitary connector or that the abutment has a through-hole running substantially in parallel to the inserting direction, in which at least one shoulder is situated, forming an end stop for the unitary connector, pointing opposite the inserting direction. Thus, the abutment generally has a continuous borehole and a shoulder, such as in the form of a step shape, on the inside of the borehole, by which the abutment can be pressed sealable against the base body.

According to a further embodiment, it is proposed that the borehole of the base body in one half of the base body facing away from the abutment has an internal thread which can be brought into engagement with the base section. Hence, the unitary connector can be easily screwed into the base body. The arrangement of the internal thread in the half of the base body facing away from the abutment enables to have tensile or compressive forces on the internal thread running substantially only in parallel to the inserting direction with simultaneous lateral support of the unitary connector in sections of the base body situated above the internal thread, so that the risk of damage, such as fractures or cracks, in the region of the internal thread that may occur in particular when thread turns and unfavorable force channeling result in unwanted notch effects is avoided.

In other words, an arrangement of the internal thread in the half of the base body facing away from the abutment has the advantage that the forces occurring on the internal thread can be guided into the lower region of the base body and therefore be kept away from the contact region with the abutment. This advantageously leads to that tensile and shear stresses in the contact region between abutment and base body, especially on bearing surfaces, can be substantially avoided. Advantageously, primarily compressive stresses remain in the contact region, which is especially advantageous for ceramic components, since the ceramic material, while resistant to compressive forces, is rather unresistant to tensile force. This arrangement therefore offers the advantage that the stability and thus the long-term success of the dental implant can be enhanced.

According to a further embodiment, it is proposed that a largest outer diameter of the unitary connector at least in a lower half of the unitary connector is adapted to a smallest inner diameter of the borehole of the base body such that the unitary connector when inserted into the borehole is guided substantially without play in the base body. The guidance without play helps facilitating the installation of the unitary connector and to increase the long-term stability of the overall implant.

According to a further embodiment, it is proposed that a smallest inner diameter of the through-hole of the abutment is adapted to a largest outer diameter of the holding element and/or the auxiliary holding element such that the holding element and/or the auxiliary holding element are/is guided substantially without play in the abutment. Preferably, the borehole of the abutment has a lower region facing toward the base body with a smaller diameter than the diameter of an upper region of the borehole of the abutment facing away from the base body, forming a mounting region for the holding element and/or the auxiliary holding element, while the two regions border on each other across the step formation such that the abutment can be pressed by the limit stop of the sleeve on the step formation in the axial direction of the dental implant into the base body in positive-fittingly sealing manner. In embodiments of the abutment with a step formation, the length of the sleeve preferably amounts to at least 50%, more preferably at least 75%, most preferably at least 85%, of the length of the upper region, or the sleeve mounting region, of the borehole of the abutment.

According to a further embodiment, it is proposed that the borehole in the base body is configured as a continuous borehole and has a cap at its lower end, which at least partly covers the borehole and which can be brought into engagement with part of the base section of the unitary connector and which can be separated from the base body when the unitary connector is installed such that the lower end of the unitary connector presses the cap into the jaw bone in a state where the base body and the unitary connector are fully inserted into the jaw bone. The flexibility of the dental implant can advantageously be further improved in that the cap is separable from the base body. If a unitary connector is too long in relation to the base body, the unitary connector can be introduced, or screwed (in embodiments with a first thread in the first end region) far enough into the base body until the unitary connector abuts against the cap, then separates the cap from the base body and presses it further into the jaw bone. The stability of the anchoring of the dental implant can be advantageously enhanced with the cap pressed further into the jaw bone. Advantageously, the additional surface created by the separated cap can help increase the degree of osseointegration.

Alternatively, the borehole of the base body is formed as a blind hole. Preferably, the length of the blind hole is at least 80%, especially preferably at least 90% of the total length of the base body. This offers the advantage that the entire length of the base body can serve for receiving forces, such as screw forces, when connecting the unitary connector to the base body.

According to a further embodiment, it is proposed that a gap is formed between a largest outer diameter of the holding element and/or the auxiliary holding element and the smallest inner diameter of the through-hole of the abutment, wherein a width of the gap amounts to preferably between 0.001 mm and 0.1 mm. The gap serves for providing an adequate play in the radial direction between the sleeve and the abutment, so that an overdetermination can be avoided. Yet the play is advantageously small enough that the sleeve can enhance the stability in that the abutment can be supported at the sleeve when transverse forces occur.

In one embodiment, the base body is made of ceramic, preferably zirconium oxide or a zirconium oxide base. In one embodiment, the abutment is made of ceramic, preferably zirconium oxide or a zirconium oxide base. Preferably the base body and/or the abutment in embodiments made of ceramic are produced by powder injection molding techniques. This offers the advantage of a cost-effective production. The ceramic material offer the advantage of a good biocompatibility as well as a high degree of osseointegration.

Moreover, the ceramic material has a cosmetic advantage compared to titanium in terms of gum regression, which often occurs with dental implants.

In embodiments of the base body made of ceramic and having an internal thread, the internal thread is preferably configured as a round thread. In one advantageous variant, the first end region of the unitary connector has a trapezoidal thread in these embodiments. This affords the advantage that the thread turns of the internal thread can be spared when screwing in the unitary connector. As compared to V-shaped threads, which cut into the internal thread and thus may damage the ceramic material, such a unitary connector with a trapezoidal thread can therefore increase the long-term success of the dental implant.

In one embodiment, the unitary connector is made of metal, preferably of stainless steel and/or titanium.

In one embodiment, the largest transverse diameter of the unitary connector in the lower half of the unitary connector corresponds to the largest transverse diameter of the borehole of the base body, such that the unitary connector can be guided as it is received in the borehole.

Optionally, a play exists between the region of the unitary connector situated in the base body after the installing and the inner wall of the borehole of the base body, so that damage due to friction can be minimized when introducing the unitary connector into the base body. Yet the play is advantageously so small that a reliable guiding or centering of the unitary connector is provided.

In one embodiment, a transverse diameter of the unitary connector corresponds to the smallest transverse diameter of the borehole of the abutment, so that the abutment can be guided by the unitary connector when being placed on the base body.

The unitary connector therefore offers the advantage that the abutment can be guided, and centered while being positioned on the base body. Preferably, a play exists between the unitary connector and the inner wall of the borehole of the abutment, so that damage due to friction can be minimized when positioning the abutment on the base body. Yet the play is advantageously so small that a reliable guiding or centering of the abutment is provided.

In one embodiment, the largest transverse diameter of the borehole of the abutment corresponds to the transverse diameter of the sleeve, such that the abutment can be supported at the sleeve in the transverse direction.

In embodiments with a stepped borehole of the abutment and a unitary connector with a cylindrical shaft and a sleeve, advantageously the smaller diameter of the borehole in the lower region of the abutment facing toward the base body corresponds to the outer diameter of the cylindrical shaft of the unitary connector. The larger diameter of the borehole in the upper region of the abutment facing away from the base body, forming the sleeve mounting region, advantageously corresponds to the outer diameter of the sleeve, so that the abutment can be supported at the sleeve and the stability of the dental implant can be enhanced when transverse forces occur. In the lower region of the borehole of the abutment, the abutment can advantageously be supported when transverse forces occur against the cylindrical shaft or partly against the second end region of the unitary connector.

In one embodiment, the abutment has an extension and the base body has a recess, the extension being insertable into the recess. Preferably, the extension of the abutment and the recess of the base body provide a torque-proof positive-fit. In one variant, the torque-proof positive-fit is created by a radially nonuniform structure of the extension (i.e., in the tangential direction). In another variant, the extension has radial protrusions, which form bearing surfaces facing in the tangential direction and can engage with radial grooves of the recess of the base body.

DESCRIPTION OF THE FIGURES

The invention shall now be explained more closely with the aid of exemplary embodiments in connection with the figures and the accompanying description. They show.

IMPLEMENTATION OF THE INVENTION

In the following, the invention is described more precisely in an exemplary manner according to possible embodiments with reference to the accompanying drawings. The combinations of features presented in these embodiments serve merely for purposes of illustration. Individual features may also be omitted, according to their above described advantages, when the advantage of the particular feature is not relevant in certain applications. For the sake of simplicity, the same features and elements in the description of the embodiments are given the same reference signs. In different embodiments, features and elements with the same or similar function may be provided with one or more apostrophes in order to assign them to one embodiment for purposes of illustration, though this assignment should not be construed as being limiting to the particular embodiment.

Figure 1:
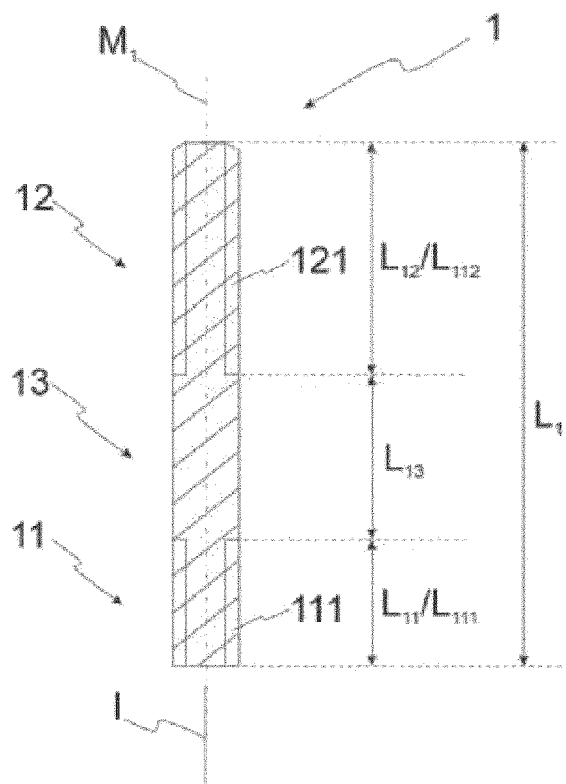
FIG. 1 a sectional illustration of a first embodiment of a unitary connector according to the invention.

FIG. 1 shows a sectional representation of a first embodiment of a unitary connector 1 according to the invention. The unitary connector 1 comprises a base section 11 with a first external thread 111 as well as an abutment holding portion 12 with a holding thread 121. Between the sections 11, 12, the unitary connector has a cylindrical shaft segment 13, so that the unitary connector 1 has the shape of a stud bolt with a center axis $M_1$, along which the unitary connector 1 can be inserted or screwed in in an inserting direction I.

The unitary connector 1 has a total length $L_1$ measured in parallel to the inserting direction I. The base section 11 and the external thread 111 have a length $L_{11}$ and $L_{111}$, respectively, measured parallel to the inserting direction I, which amount to 0.2 to 0.3, preferably 0.25, corresponding to one quarter, of the total length $L_1$. The abutment holding portion 12 and the holding thread 121 have a length $L_{12}$ and $L_{112}$, respectively, measured parallel to the inserting direction I, which amount to 0.3 to 0.6, preferably 0.4 to 0.5, most preferably 0.416, corresponding to five twelfths, of the total length $L_1$. The shaft segment 13 has a length $L_{13}$, measured parallel to the inserting direction I, which amounts to 0.3 to 0.4, preferably 0.333, corresponding to one third, of the total length $L_1$.

The unitary connector 1 for example is made of stainless steel, titanium and/or ceramic.

In certain embodiments it may be especially advantageous to make the unitary connector out of stainless steel and/or titanium, especially if it is received in isolation within an otherwise ceramic implant, hermetically closed off from jaw and gums, so that the issue of biocompatibility can be rather of secondary importance for the unitary connector 1 itself and can give way to an optimization of its mechanical properties.

Figure 2:
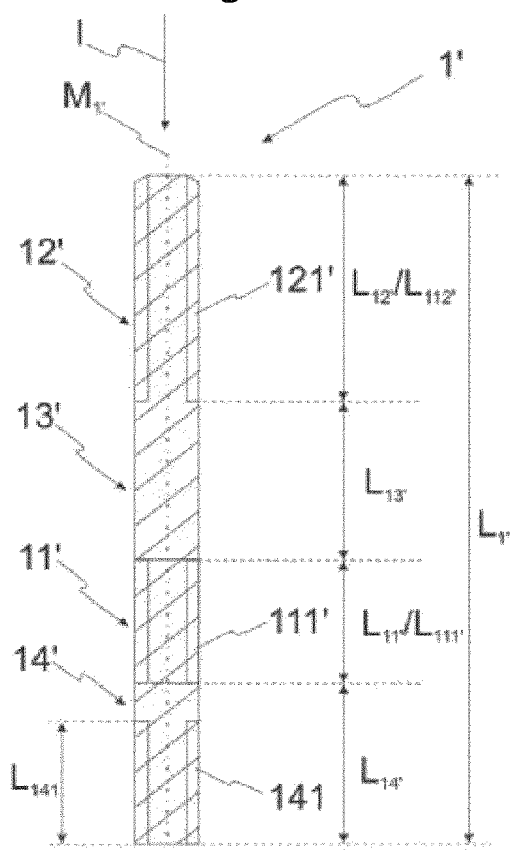
FIG. 2 a sectional illustration of a second embodiment of a unitary connector according to the invention.

FIG. 2 shows a sectional illustration of a second embodiment of a unitary connector 1' with a base section 11' and a first external thread 111' as well as an abutment holding portion 12' and a holding thread 121'. Adjacent to the base section 11' there is arranged a bolt extension 14' in suitable manner. For example, the bolt extension 14' may be connected to the base section 11' by means of a screw connection in a recess at the center axis of the base section 11' or by means of a glue connection at its end face. The bolt extension 14' has an extension thread 141, which can be brought into engagement with an internal thread of a base body of a dental implant. By means of the bolt extension 14', the unitary connector 1' can be lengthened and therefore used for long dental implants. Alternatively, or additionally, the bolt extension 14' can also be arranged in similar fashion on the abutment holding portion 12' in order to lengthen it.

The unitary connector 1' similar to the unitary connector 1 has a total length $L_{1'}$, measured parallel to the inserting direction I, which can amount for example to a sum of the total length $L_1$ of the unitary connector 1 plus a length $L_{14'}$ of the bolt extension 14', measured parallel to the inserting direction I. The base section 11' and the external thread 111' have a length $L_{11'}$ and $L_{111'}$, respectively, measured parallel to the inserting direction I, which likewise amount to 0.2 to 0.3, preferably 0.25, corresponding to a quarter, of the total length $L_1$. The abutment holding portion 12' and the holding thread 121' have a length $L_{12'}$ and $L_{112'}$, respectively, measured parallel to the inserting direction I, which amount to 0.3 to 0.6, preferably 0.4 to 0.5, most preferably 0.416, corresponding to five twelfths, of the total length $L_1$. The shaft segment 13' has a length $L_{13'}$, measured parallel to the inserting direction I, which amounts to 0.3 to 0.4, preferably 0.333, corresponding to one third, of the total length $L_1$.

With the aid of the bolt extension 14' the aforementioned length relations derived from the unitary connector 1' between the individual sections of the unitary connector 1' with respect to its total length $L_{1'}$ can be shifted or adapted to meet the particular requirements. The shifting or adapting of the length relations is obtained from the length $L_{14'}$ of the bolt extension 14', where the total length $L_1$ of the unitary connector 1 represents a kind of base length, which can be varied with the aid of different types of bolt extension 14'.

In the present exemplary embodiment of the unitary connector 1' with bolt extension 14', the length $L_{14'}$ amounts to 0.3 to 0.4, preferably 0.333, corresponding to one third, of the total length $L_1$. Thus, the length of the extension thread may in turn correspond to the length $L_{111'}$ of the external thread. The unitary connector 1 or 1' may thus be lengthened or optionally shortened by bolt extensions 14' each time incrementally by 0.3 to 0.4, preferably 0.333, corresponding to a third, of the total length $L_1$, if it is originally provided with at least one bolt extension 14' and can be cut to length by removing the at least one bolt extension 14'.

Figure 3:
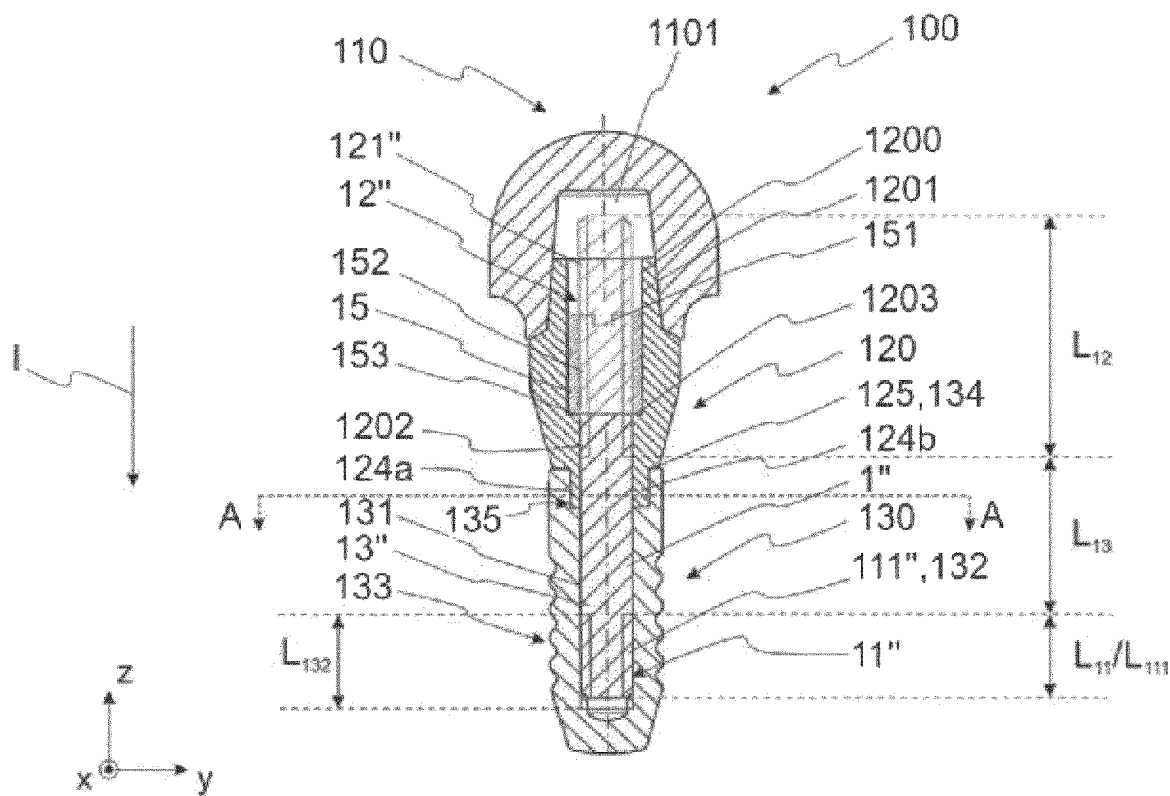
FIG. 3 a sectional illustration of a dental implant with a first embodiment of a unitary connection system according to the invention.

FIG. 3 shows a sectional illustration of a dental implant 100 with a first embodiment of a unitary connection system according to the invention. The dental implant 100 comprises a base body 130, an abutment 120 and a tooth structure 110. The inserting direction I of the dental implant 100 is indicated by an arrow. The base body 130 and the abutment 120 are preferably made from a ceramic material. The base body 130 has an external thread 133 in the form of a round thread. Further, the base body 130 has a borehole 131 in the form of a blind hole, while the borehole 131 has an internal thread 132 in the lower half of the base body 130 facing away from the abutment 120. In order to clarify the directions "up" and "down", the coordinate system is shown in the figure. The internal thread 132 is brought into engagement with a first external thread 111" in the base section 11" of a unitary connector 1", which is introduced into the borehole 131.

The length $L_{111}$ of the first external thread 111" is slightly less than a length $L_{132}$ of the internal thread 132 measured parallel to the inserting direction I. The internal thread 132 is formed as a round thread. The diameter of the borehole 131 corresponds to the diameter of the unitary connector 1", so that the unitary connector 1" is guided as it is inserted into the base body 130. The abutment 120 has a through-hole 1200 with upper region 1201 and lower region 1202, the diameter of the through-hole 1200 in the upper region 1201 being larger than the diameter of the through-hole 1200 in the lower region 1202. The upper region 1201 borders on the lower region 1202 across a shoulder 1203.

The diameter of the through-hole 1200 in the lower region 1202 corresponds to the diameter of the cylindrical shaft segment of the unitary connector 1", so that the abutment 120 is guided by the cylindrical shaft segment 13" of the unitary connector 1" as it is placed on the base body 130. The length $L_{13}$ of the cylindrical shaft segment 13" is advantageously dimensioned such that it laterally supports both the abutment 120 and the base body and absorbs or passes on any transverse and/or shear forces as far away as possible from the base section 11" and the abutment holding portion 12".

A holding element 15 is inserted in the through-hole 1200 in the upper region 1201, being brought into engagement with the holding thread 121" in the abutment holding portion 12" of the unitary connector 1", or it is screwed on via an internal thread 152 of the holding element 15. The abutment holding portion 12" has a length $L_{12}$. The holding element 15 is likewise made of stainless steel, titanium and/or ceramic. The outer diameter of the holding element 15 corresponds to the diameter of the upper region 1201 of the through-hole 1200 of the abutment 120, forming the sleeve mounting region, so that the abutment 120 can bear against the holding element 15 when transverse forces are acting, which improves the stability of the dental implant 100. A gap exists between the lateral outer surface of the holding element 15 and the lateral inner surface of the upper region 1201 of the through-hole 1200, ensuring a play. The holding element 15 has engaging means 151 in the form of notches, which can be brought into engagement with a suitable wrench (not shown).

With the suitable tool or wrench, the holding element 15 can be screwed by the engaging means 151 onto the abutment holding portion 121" of the unitary connector 1". The holding element 15 has an internal thread 152, which is brought into engagement with the holding thread 121" of the unitary connector 1". By screwing on the holding element 15, an operative connection is created between the unitary connector 1" and the abutment 120 such that the abutment 120 is pressed by the holding element 15 across the shoulder 1203 onto the base body 130 and thus a sealed positive-fitting connection is formed between the abutment 120 and the base body 130. When the holding element 15 is screwed on, the contact surface 125 of the abutment 120 rests in this case against the contact surface 134 of the base body 130.

Figure 4:
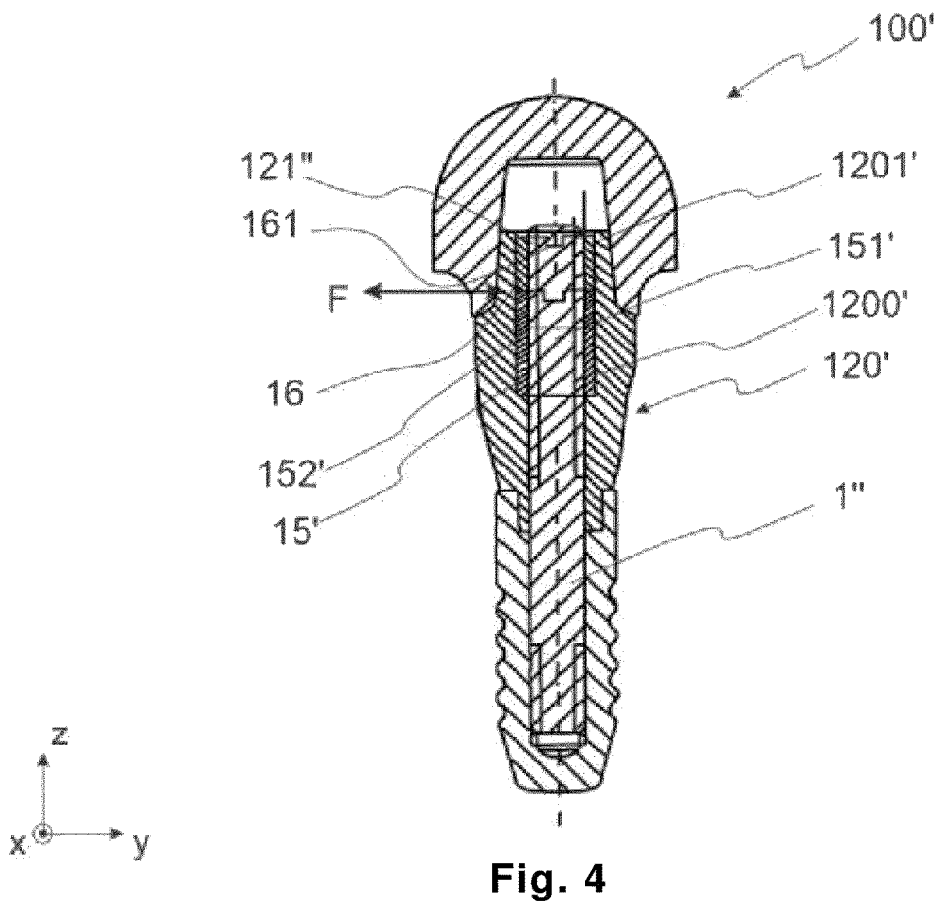
FIG. 4 a sectional illustration of a dental implant with a second embodiment of a unitary connection system according to the invention.

The abutment 120 further has an extension 124a,b, which is received in a positive-fitting receptacle 135 in the form of a depression of the base body 130. The extension 124a,b is asymmetrically configured in the radial direction, so that a torque-proof positive-fit is assured. In cross section (in the y-direction), the extension 124a,b has protrusions, which are shown in the cross section in FIG. 5. In FIG. 3 or 4 it can be seen that the abutment holding portion 12" of the unitary connector 1" extends beyond the abutment 120. Before the tooth structure 110 is set in place, the unitary connector 1" can be cut to length as needed in the abutment holding portion 12", if the extending portion should prove to be too large. Alternatively, or in addition, a recess 1101 in the tooth structure 110 can be used, as shown in the figure, which receives the extending portion of the abutment holding portion 12".

FIG. 4 shows a second embodiment of a dental implant 100' according to the invention. Unlike the dental implant 100 shown in FIG. 3, the dental implant 100' has an abutment 120' whose length, measured parallel to the inserting direction I, is larger than the length of the abutment 120 measured parallel to the inserting direction I. Accordingly, an upper end of a unitary connector 1" of the dental implant 100' protrudes less from the through-hole 1200' beyond the upper edge of the abutment 120' than is the case with the dental implant 100.

The dental implant 100' is provided with an auxiliary holding element 16. The auxiliary holding element 16 is screwed onto the holding thread 121" of the unitary connector 1", resting against the holding element 15'. The auxiliary holding element 16 has an internal thread, which is brought into engagement with the holding thread 121" of the unitary connector 1". The auxiliary holding element 16 has engaging means 161, by which the auxiliary holding element 16 can be screwed onto the holding thread 121".

The auxiliary holding element 16 enhances the stability of the dental implant 100', since the surface by which the abutment 120' can be supported is increased. The length of the holding element 15' and the length of the auxiliary holding element 16 nearly corresponds to the length of the upper region 1201' of the through-hole 1200'. Thus, the abutment 120' when transverse forces are acting on the dental implant 100' can rest laterally against both the preferably sleeve-shaped holding element 15' and the likewise preferably sleeve-shaped auxiliary holding element 16.

For illustrative purposes, FIG. 4 shows the double arrow F, which is supposed to represent transverse forces occurring. The forces F may result in torques, which without holding elements or with short holding elements would be concentrated substantially at the lower region of the through borehole 1200' of the abutment 120'. Long holding elements 15' or auxiliary holding elements 16 enable a lateral bracing of the abutment 120' under transverse forces F, so that the torques which occur can be distributed substantially along the entire length of the through-hole 1200' and absorbed.

Figure 5:
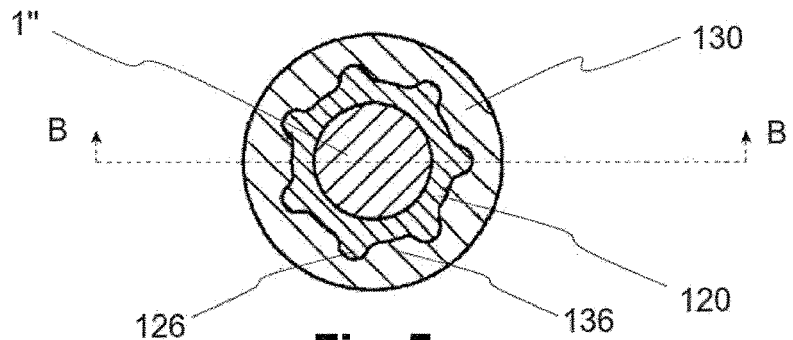
FIG. 5 a sectional illustration of the dental implant shown in FIG. 3 along the section line A-A indicated in FIG. 3.

FIG. 5 shows the dental implant 100 shown in FIG. 3 in a schematic cross section view along the sectioning line A-A drawn in FIG. 3 in a region where the extension 124a, b engages with the receptacle 135. On the outside of the extension 124a, b there are formed protrusion-like positive elements 126, extending radially away from the extension 124a, b, running parallel to the inserting direction I. The receptacle 135 is provided with negative elements 136 likewise running parallel to the inserting direction I, being configured complementary to the positive elements 126.

The positive elements 126 interact by positive-fit with the negative elements 136 such that in the assembled state relative movements, especially rotary movements, of the abutment 120 with respect to the base body 130 are prevented. At the same time, the positive elements 126 and negative elements 136 together define a circular grid of rotary positions along which a rotational orientation of abutment 120 and base body 130 can be chosen freely in incremental steps relative to each other prior to the assembly process.

According to the nature of the holding thread 121, 121' as such and due to its variable position ability along the inserting direction I due to the described lengthening and/or shortening option, the unitary connectors 1, 1' according to the invention provide a variety of holding positions for the abutment 120, 120' spaced apart from each other along the inserting direction I.

Figure 6:
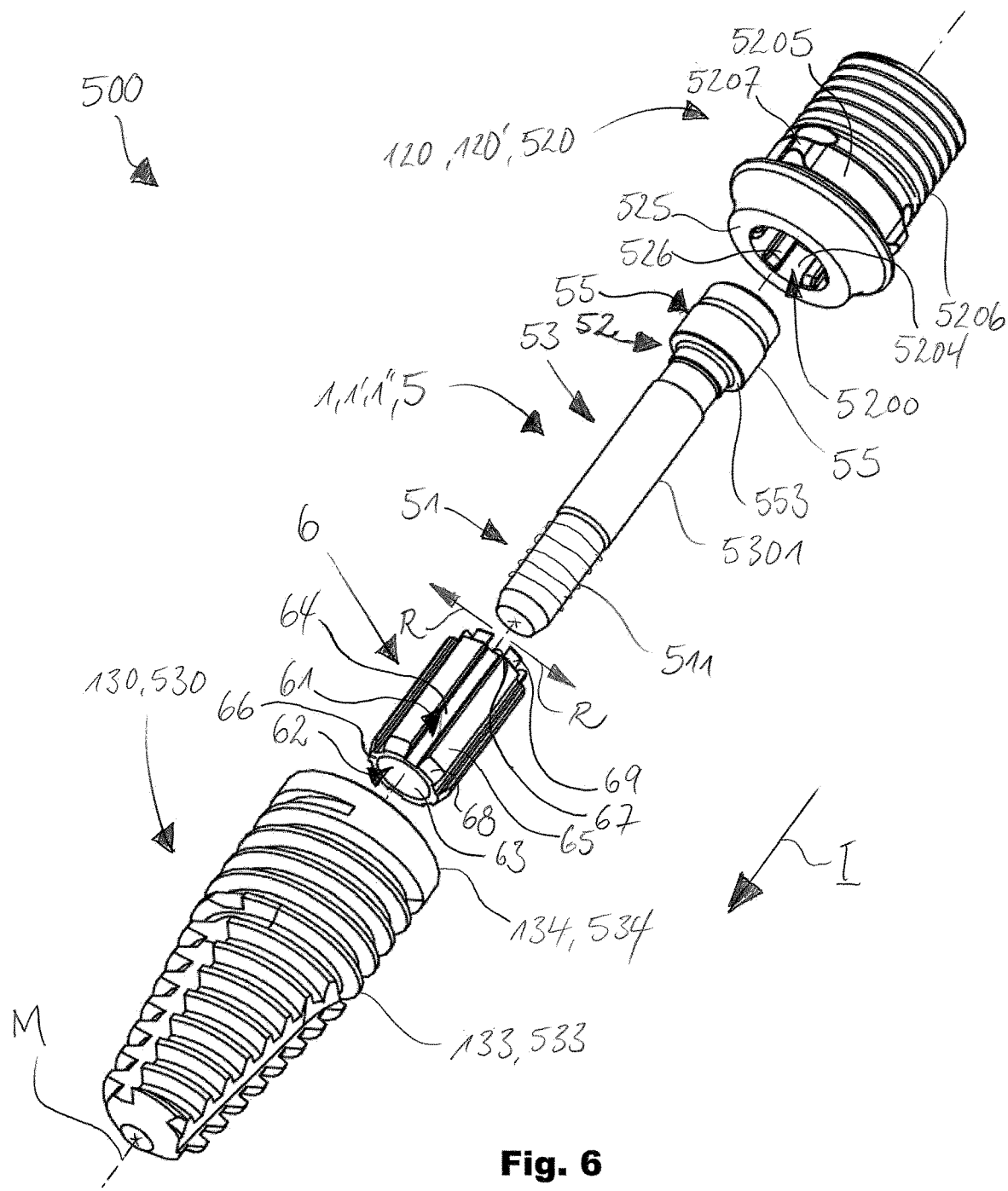
FIG. 6 a schematic exploded illustration of a further embodiment of a dental implant according to the invention.

FIG. 6 shows a schematic exploded illustration of a further embodiment of a dental implant 500 according to the invention. The dental implant 500 comprises an abutment 520, a base body 530, a connector 5 and a bushing body 6. The abutment 520 and the base body 530 are preferably made of ceramic material. The connector 5 and the bushing body 6 are preferably made of a non-ceramic material, such as a metal, a metal alloy, a plastic and/or carbon fibers. The dental implant 500 has a center axis M. The abutment 520, the base body 530, the connector 5 and the bushing body 6 may be configured substantially rotationally symmetrically to the center axis M. A radial direction R extends radially away from the center axis M. As in the case of the above described embodiments of the dental implant 100, 100', the connector 5 and here additionally the bushing body 6 is configured to be insertable in the inserting direction I into the base body 530.

The abutment 520 may be configured substantially like the above described embodiments of the abutment 120, 120'. Accordingly, the abutment 520 has a through-hole 5200. In the through-hole 5200 there are arranged positive elements 526, extending opposite the radial direction R away from an inner circumferential surface 5204 of the through-hole 5200 toward the center axis M. Around the through-hole 5200 there is formed a contact surface 525 on the abutment 520, pointing substantially in the direction of the center axis or the inserting direction I and thus in an axial direction of the dental implant 500. Furthermore, along an outer circumference 5205 of the abutment 520, a prosthesis thread 5206 as well as detent elements 5207 are formed on the abutment 520. The prosthesis thread 5206 serves for fastening a tooth structure, such as the above described tooth structure 110, on the abutment 520. The detent elements 5207 serve for locking the tooth structure on the abutment 520 in a desired rotary position about the center axis M.

The base body 530 may be configured substantially like the above described base body 130 and for this purpose have an external thread 533 with which the base body 530 can be screwed into a jaw bone. Likewise, the base body 530 has a borehole 531, in which is arranged an internal thread 532 for screwing the connector 5 into the base body 530 (see FIGS. 8 to 10, 12 and 14). A contact surface 534 formed on the base body 530 points opposite the inserting direction I and is configured to lie terminating flush against the contact surface 525 of the abutment 520.

The connector 5 may be configured substantially like an above described embodiment of the unitary connector 1, 1', 1". Thus, the connector 5 has a base section 51, on which a base thread 511 is formed as a lower external thread. Furthermore, the connector 5 has an abutment holding portion 52, on which a holding element 55 is formed, which can alternatively also be provided as a separate holding element 15, 15', as in the case of the unitary connector 1, 1', 1", configured for mounting on a holding thread 121, 121', 121" formed on the connector 5 as an upper external thread. Like the holding element 15, 15', the holding element 55 provides a holding surface 553 facing in the inserting direction I. Between the base section 51 and the abutment holding portion 52 there is arranged a shaft segment 53 of the connector 5, which is configured to be received in the bushing body 6 and which provides an outer circumferential surface 5301 for support in the radial direction R in the bushing body 6.

The bushing body 6 is sleeve-shaped and has a substantially cylindrical shell section 61, providing a through opening 62 for the mounting of the connector 5. In the through opening 62 a substantially cylindrical inner circumferential surface 63 of the bushing body 6 is configured to enclose the connector 5, lying as far as possible with little play or no play against the outer circumferential surface 5301 of the connector 5. On the outside, the shell section 61 provides a substantially cylindrical outer circumferential surface 64. Positive-fit elements 65 of the bushing body 6 extend in the radial direction R away from the outer circumferential surface 64 and run from a lower edge 66 of the bushing body 6 pointing in the inserting direction I substantially to an upper edge 67 of the bushing body 6 pointing opposite the inserting direction I. In the direction of the lower edge 66, the positive-fit elements 65 are respectively provided with an inserting bevel 68, which helps introduce the bushing body 6 properly into the base body 530. At the upper edge 67 are formed lugs 69, extending away from the upper edge 67 opposite the inserting direction I.

Figure 7:
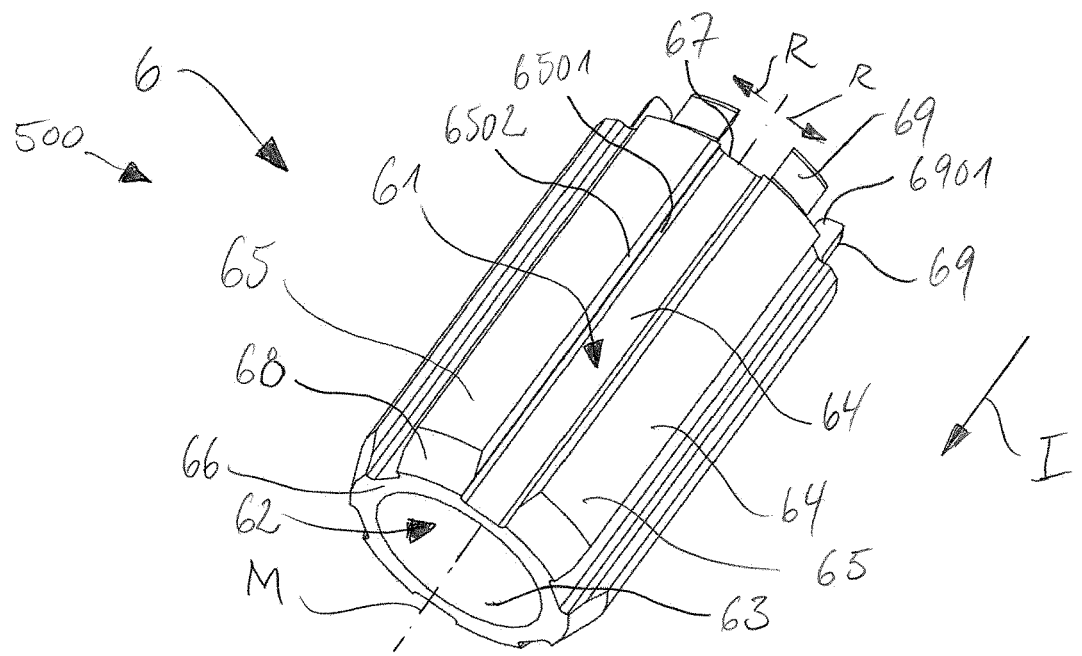
FIG. 7 a schematic perspective view of a bushing body according to the invention of the dental implant illustrated in FIG. 6.

FIG. 7 shows a schematic perspective view of the bushing body 6. It becomes clear here that the positive-fit elements 65 have an outer section 6501 tapering slightly in the radial direction R in a projection along the inserting direction I and thus being configured substantially as a trapezoid in cross section and an inner section 6502 formed substantially as a circular segment in a projection along the inserting direction I. Due to the tapering of the outer section 6501, on the one hand a jamming of the bushing body 6 when the bushing body 6 is inserted into the base body 530 is prevented. On the other hand, the trapezoidal configuration helps prevent notch effects of the bushing body 6 in the base body 530.

Furthermore, the inserting bevels 68 extend only along the outer section 6501 of the positive-fit elements 65, so that the inner section 6502 of the positive-fit elements forms part of the lower edge 66, which in turn helps receive the bushing body 6 with as little play as possible in a desired rotary position about the center axis M in the base body 530. Moreover, at a distal end of the lugs 69 there is formed respectively a latching element 6901, which protrudes from the lug 69 opposite the radial direction R in the direction of the center axis M and serves to latch the bushing body 6 to the connector 5, as shall be discussed further in detail below.

Figure 8:
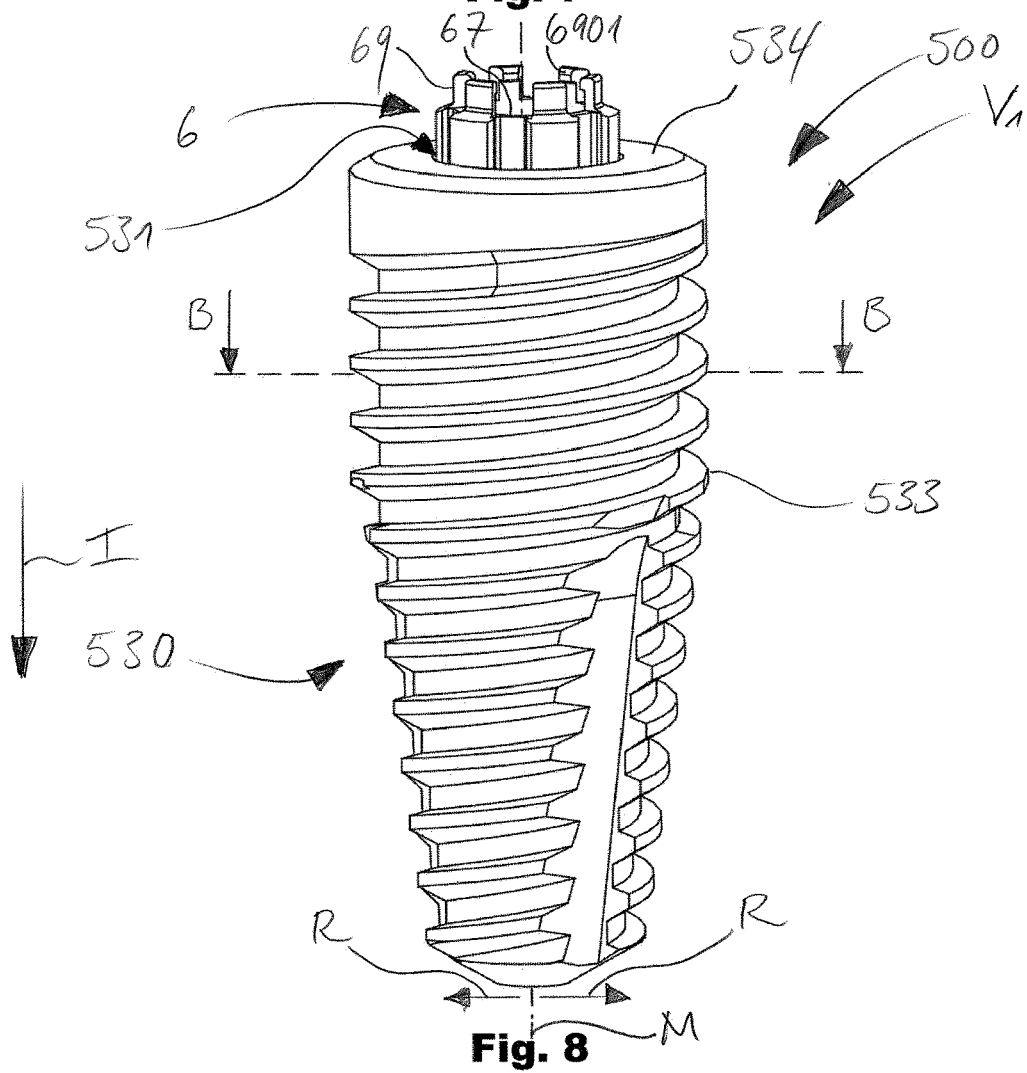
FIG. 8 a schematic perspective view of the dental implant represented in FIG. 6 in a preassembly state, in which the bushing body is installed in a base body of the dental implant.

FIG. 8 shows a schematic perspective view of the represented dental implant 500 in a preassembly state $V_1$ in which the bushing body 6 has been inserted into the base body 530 of the dental implant 500. In the preassembly state $V_1$ the bushing body 6 is received in a borehole 531 of the base body 530 such that the bushing body 6 protrudes from the base body 530 opposite the inserting direction I beyond the contact surface 534 of the base body 530. Hence, the base body 530 and the bushing body 6 in the preassembly state $V_1$ are ready to receive the abutment 520 and the connector 5.

Figure 9:
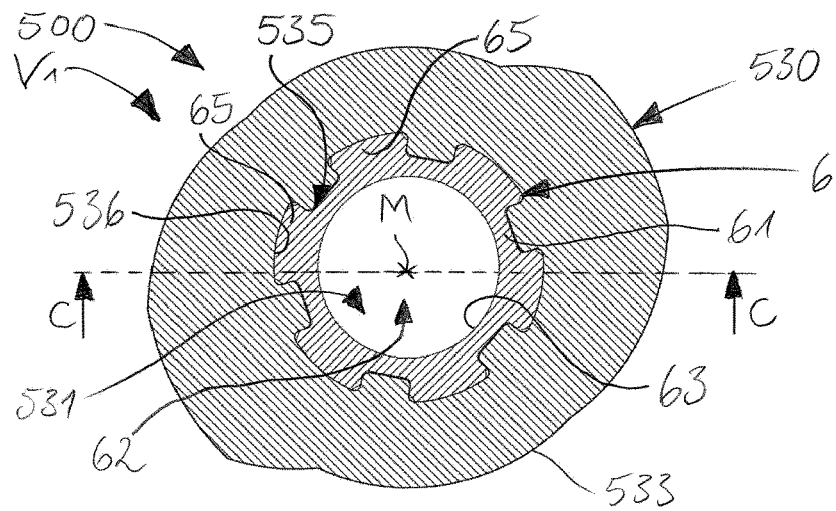
FIG. 9 a schematic cross-sectional view of the dental implant represented in FIG. 8 in the preassembly state along the section line B-B indicated in FIG. 8.

FIG. 9 shows a schematic cross section view of the dental implant 500 shown in FIG. 8 in the preassembly state $V_1$ along the section line B-B depicted in FIG. 8. It becomes clear here that the bushing body 6 is received by its outer circumferential surface 64 substantially flush against an inner circumference of a mount 535 provided in the borehole 531 in the base body 6. The positive-fit elements 65 formed on the bushing body 6 engage by positive fit with negative elements 536 extending along the mount 535 and fashioned complementary to the positive-fit elements 65.

Figure 10:
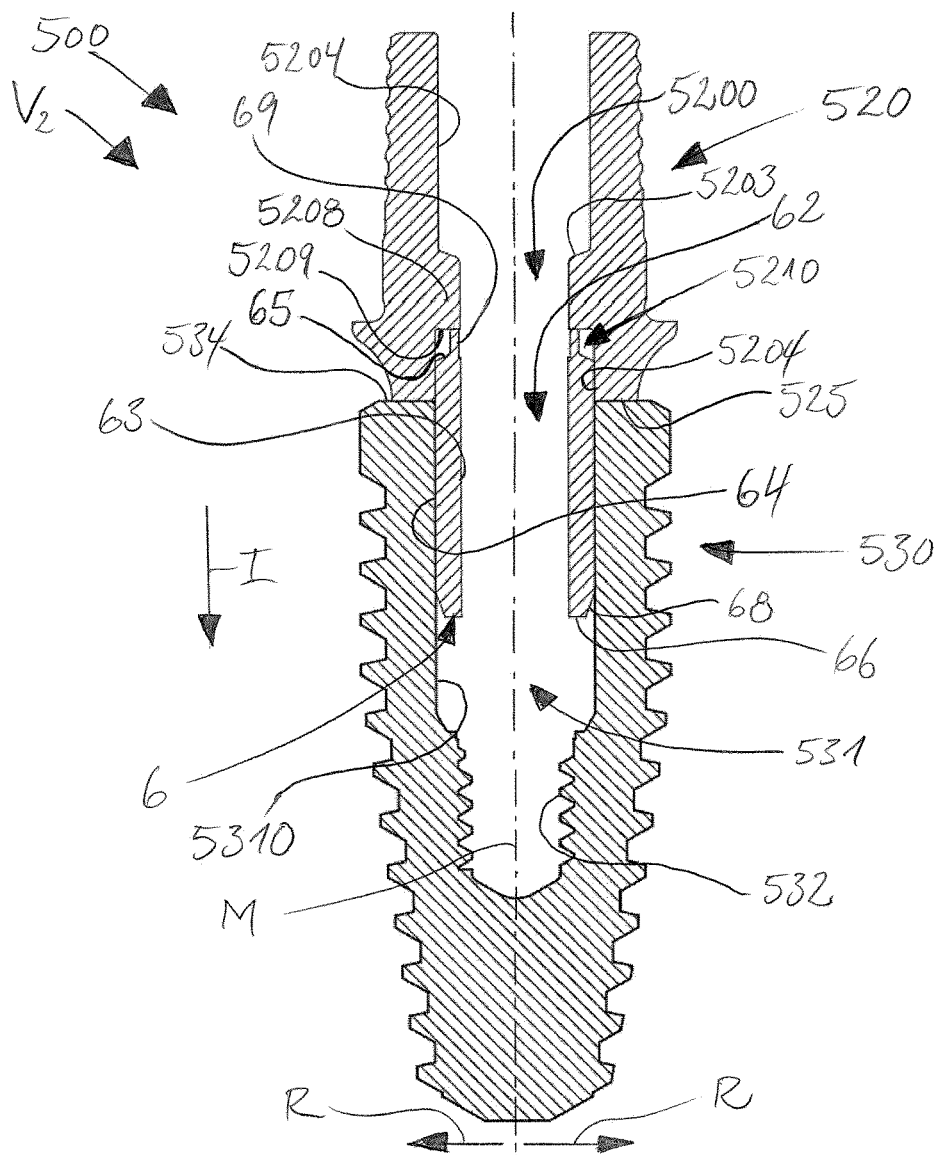
FIG. 10 a schematic cross-sectional view of the dental implant illustrated in FIGS. 8 and 9 in a further preassembly state along a section line C-C indicated in FIG. 9.

FIG. 10 shows a schematic cross section view of the dental implant 500 shown in FIGS. 8 and 9 in a further preassembly state $V_2$ along a sectioning line C-C drawn in FIG. 9. In order to transfer the dental implant 500 from the preassembly state $V_1$ to the further preassembly state $V_2$, the abutment 520 is placed in the inserting direction I on the base body 530, so that the contact surface 525 of the abutment 520 rests on the contact surface 534 of the base body 530. According to the view shown in FIG. 10, sections of the outer circumferential surface 64 formed by the positive-fit elements 65 of the bushing body 6 lie beneath the contact surfaces 525, 534 flush against the inner circumference of the borehole 531 of the base body 530. The lower edge 66 of the bushing body 6 is situated above an internal thread 532, spaced apart from the latter in the inserting direction I.

The part of the bushing body 6 protruding opposite the inserting direction I beyond the contact surfaces 525, 534 is received in the through-hole 5200 formed in the abutment 520. The positive-fit elements 65 of the bushing body 6 interact in positive-fit with the positive elements 526 formed on the abutment 520. The positive-fit elements 65 of the bushing body 6 are formed both complementary to the positive elements 526 of the bushing body 6 and complementary to the negative elements 536 of the base body 530. Hence, the base body 6 ensures a relative rotary position of the abutment 520 with respect to the base body 530 about the center axis M.

Furthermore, similar to the above described abutment 120, 120', a shoulder 5203 pointing opposite the inserting direction I is arranged in the through-hole 5200 of the abutment 520. The shoulder 5203 protrudes against the radial direction R from the inner circumferential surface 5204 of the abutment 520. The shoulder 5203 is formed in a protrusion 5208 which extends opposite the radial direction R from the inner circumferential surface 5204. One side of the protrusion 5208 facing in the direction of the inserting direction I forms a limit stop 5209, against which the lugs 69 of the bushing body 6 can come to rest opposite the inserting direction I. Between the lugs 69 and the inner circumferential surface 5204, in the radial direction R and above the positive-fit elements 65, a free space 5210 is situated opposite the inserting direction I as far as the limit stop 5209, preventing the exerting of a notch effect on the abutment 520 by the bushing body 6, especially its positive-fit elements 65, or the outer circumferential surface 64.

Figure 11:
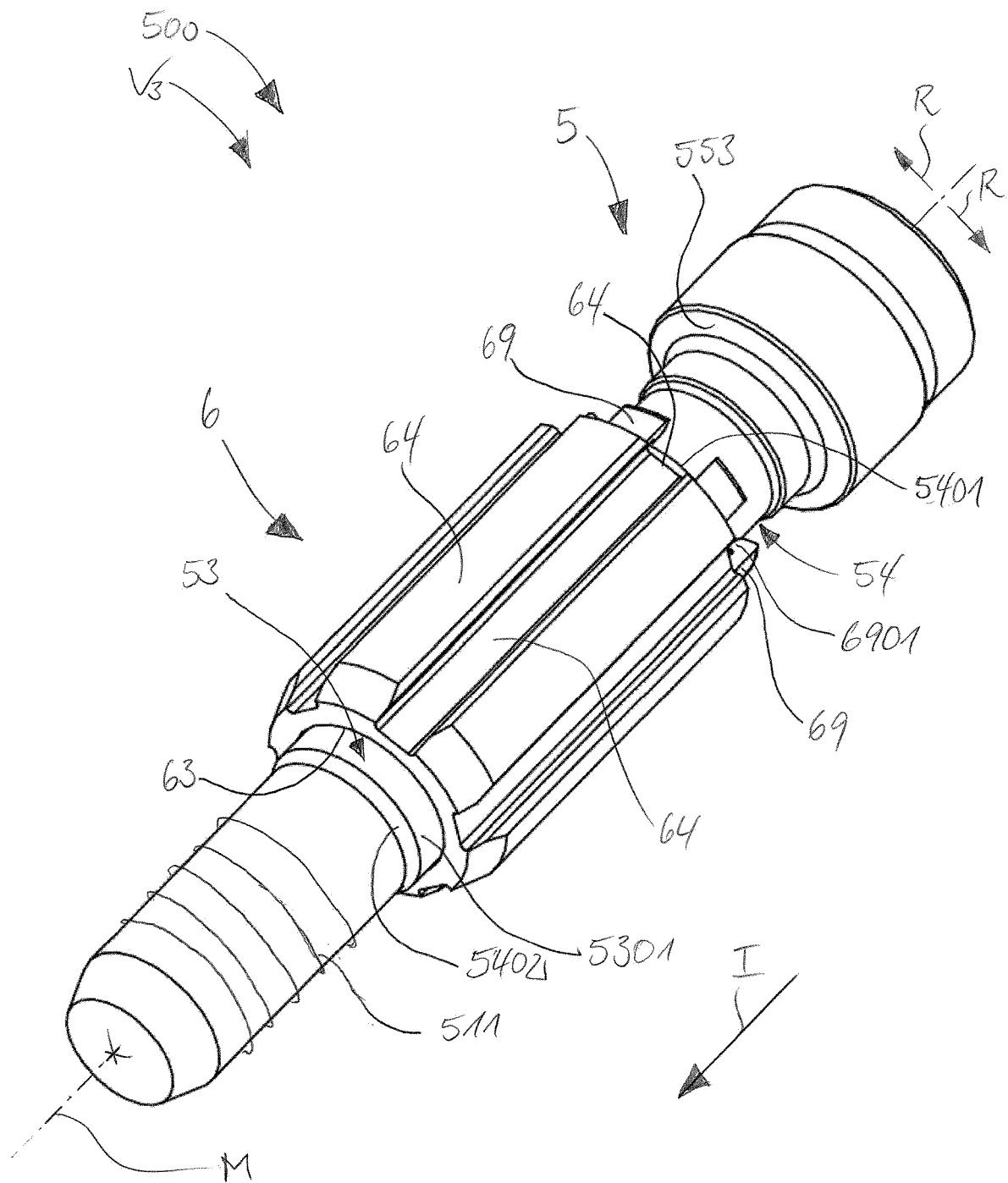
FIG. 11 a schematic perspective view of a bushing body and a connector of the dental implant illustrated in FIG. 6 in an additional preassembly state.

FIG. 11 shows a schematic perspective view of the bushing body 6 and the connector 5 in an additional preassembly state $V_3$. In the additional preassembly state $V_3$ the bushing body 6 is held on the connector 5. The bushing body 6 surrounds the shaft segment 53 with its inner circumferential surface 63 or lies by its inner circumferential surface 63 against the outer circumferential surface 5301 of the shaft segment 53 or is spaced apart from it with slight play, so that the connector 5 can be rotated about the center axis M with respect to the bushing body 6, thus providing a kind of plain bearing for the connector 5.

The latching elements 6901 of the bushing body 6 engage, opposite the radial direction R, with a counter latching element 54 formed on the connector 5 in the shape of an annular groove, so that the latching elements 6901 overlap in a projection along the inserting direction with an annular flange 5401 formed by a side wall of the annular groove 54 in its transition region to the shaft segment 53 or with the shaft segment 53. For the latching elements 6901 resting against the annular flange 5401 in the inserting direction I, the upper edge 67 is situated beneath the annular flange 5401 in the inserting direction I.

Furthermore, a diameter of the shaft segment 53 measured in the radial direction R can be greater than a diameter of the base thread 511 likewise measured in the radial direction R. Hence, a further annular flange 5402 is formed between the shaft segment and the base thread 511, pointing substantially in the inserting direction I. Alternatively, the diameter of the base thread 511 may exceed the diameter of the shaft segment 53 as well as the inner diameter of the through opening 62 of the bushing body, likewise measured parallel to the radial direction R, for example in that the base thread 511 is formed after shoving the bushing body 6 onto the shaft segment 53. In this way, the bushing body 6 can likewise be held captively on the connector 5, at least temporarily.

Figure 12:
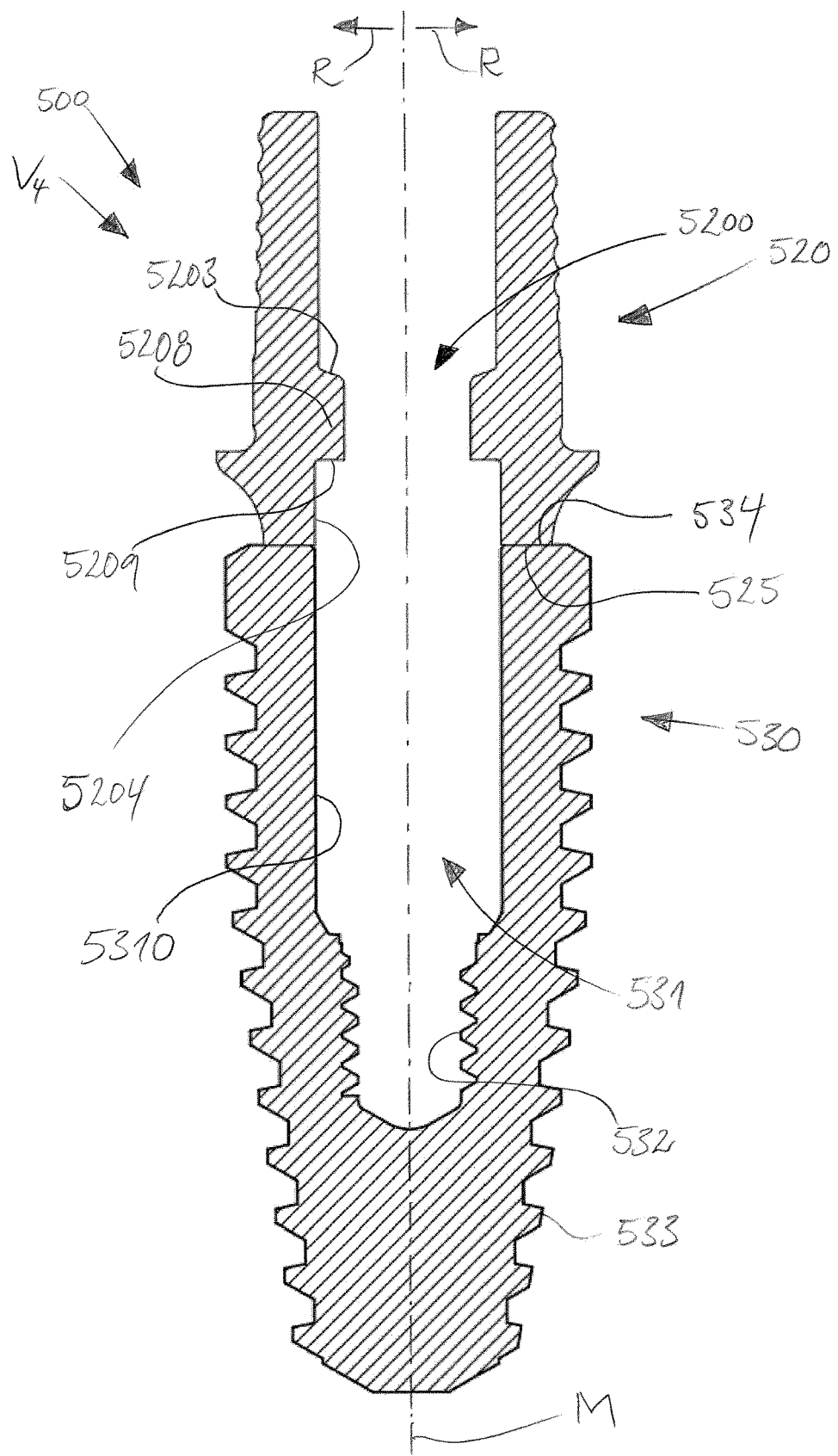
FIG. 12 a schematic cross-sectional view along a center axis of an abutment and a base body of the dental implant shown in FIG. 6 in a further additional preassembly state.

FIG. 12 shows a schematic cross section view along the center axis M in a further additional preassembly state $V_4$. In the further additional preassembly state $V_4$ the abutment 520 has been placed on the base body 530, so that the contact surface 525 of the abutment 520 lies on the contact surface 534 of the base body 530 and the inner circumferential surface 5204 of the through-hole 5200 of the abutment 520 lies substantially flush with an inner circumferential surface 5310 of the borehole 531 in the inserting direction I. Thus, the dental implant 500 comprising the base body 530 and the abutment 520 in the further additional preassembly state $V_4$ is ready to receive part of the dental implant 500 comprising the connector 5 and the bushing body 6 in the additional preassembly state $V_3$ in order to secure the abutment 520 on the base body 530.

Figure 13:
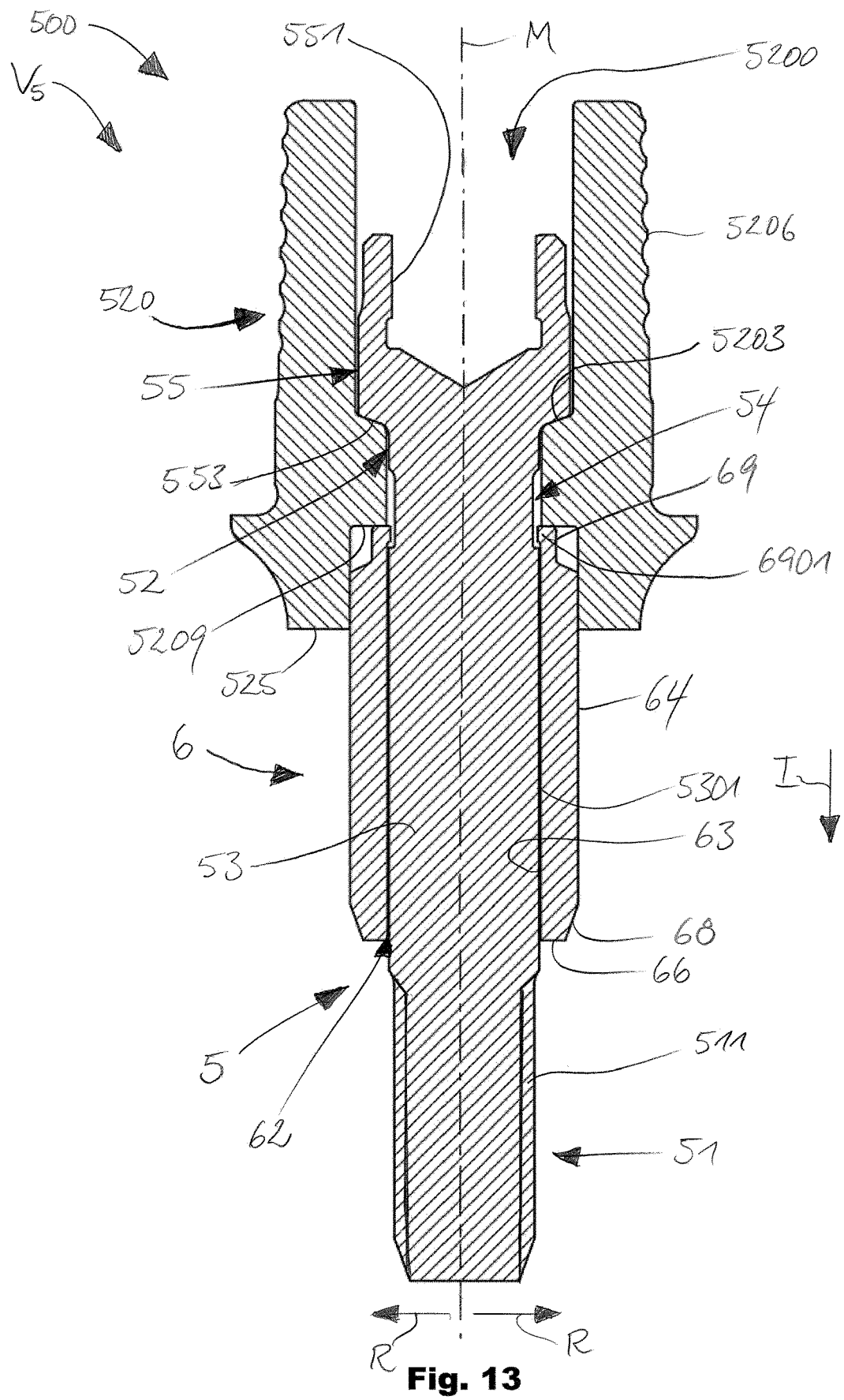
FIG. 13 a schematic cross-sectional view along a center axis of a connector, an abutment and a bushing body of the dental implant shown in FIG. 6 in a supplemental preassembly state.

FIG. 13 shows a schematic cross section view along the center axis M of the connector 5, the abutment 520 and the bushing body 6 of the dental implant 500 shown in FIG. 6 in a supplemental preassembly state $V_5$. In the supplemental preassembly state $V_5$ the connector 5 has been inserted in the inserting direction I into the through-hole 5200 of the abutment 520, for example, until the holding surface 553 on the holding element 55 lies against the shoulder 5203 of the abutment. After this, the bushing body 6 is shoved contrary to the inserting direction I across the base section 51 of the connector 5 onto its shaft segment 53, for example until the latching elements 6901 of the bushing body 6 engage with the counter latching element 54 formed on the connector 5 and/or until the lugs 69 of the connector 5 rest against the end stop 5209 of the abutment 520. Alternatively, or additionally, a positive-fit and/or a glue connection between bushing body 6 and abutment 520 can serve for initially pre-mounting the bushing body 6 in the abutment 520. As a further alternative or additional possibility for a locking between the bushing body 6 and the connector 5, the bushing body 6 can be fastened to the connector 5 by force fitting, such as clamping, and/or by gluing.

Consequently, the connector 5, the abutment 520 and the bushing body 6 in the supplemental preassembly state $V_5$ form a kind of preassembled unit, which is ready to be installed in the inserting direction I into the base body 530. This may help to greatly simplify the handling of a dental implant 500 according to the invention, because with the connector 5, the abutment 520 and the bushing body 6 in the supplemental preassembly state $V_5$ already three of the five components of the dental implant shown here, the other two components being the base body 330 and the tooth structure 110, can be more or less joined together in captive manner. An engaging means 551 for operating the connector 5 can be arranged accessibly through the through-hole 5200 of the abutment 520. Advantageously, the connector 5 and/or the bushing body 6 are received in the through-hole 5200 of the abutment 520 able to rotate with respect to the abutment 520 about the center axis M, so that the base section 51 can be screwed by the base thread 511 of the connector 5 into the internal thread 532 of the base body 530 (see FIG. 12).

Figure 14:
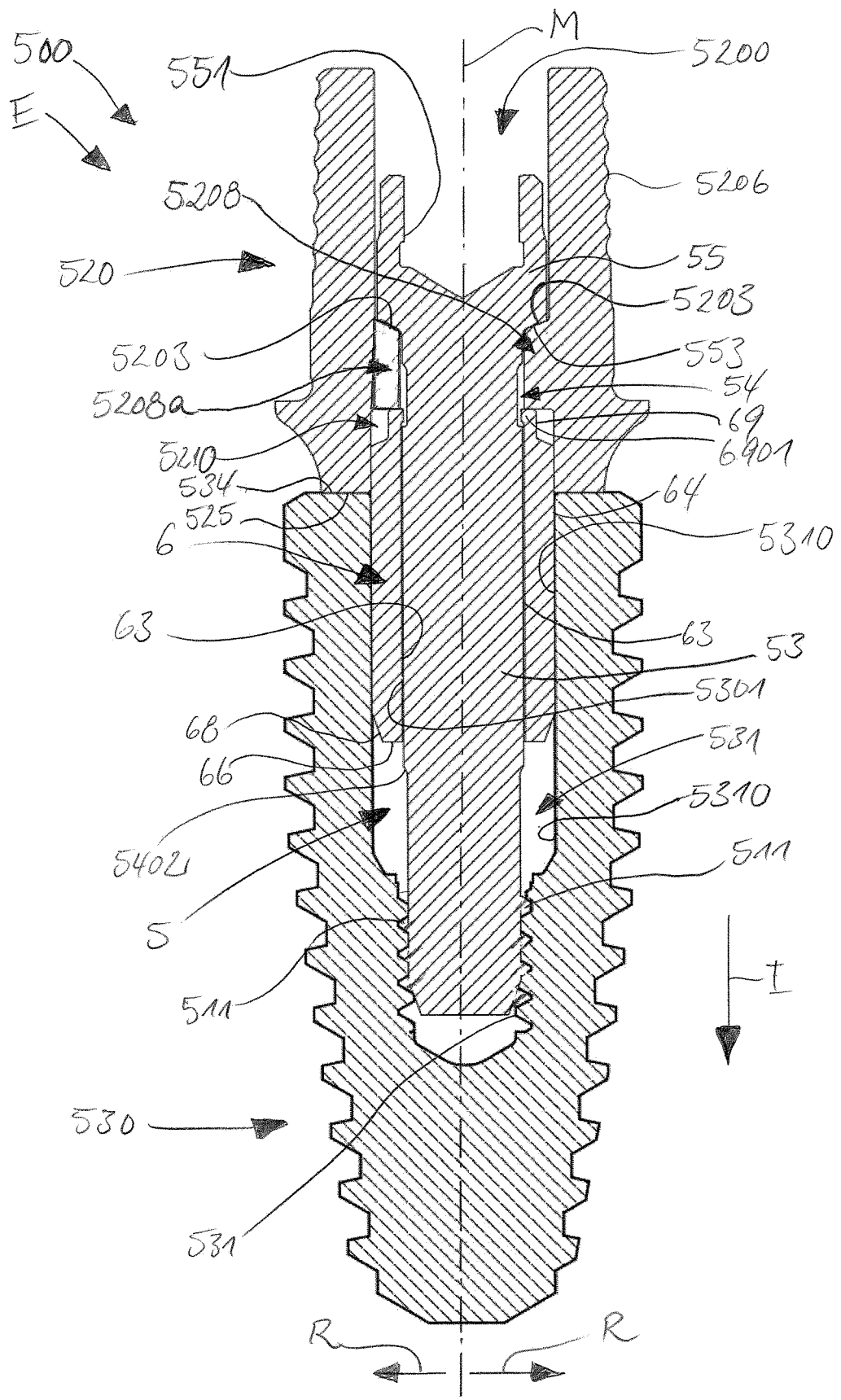
FIG. 14 a schematic cross-sectional view along the center axis of the dental implant shown in FIG. 6 in a final assembly state.

FIG. 14 shows a schematic cross section view along the center axis M of the dental implant 500 in a final assembly state E. The dental implant 500 on the one hand can be converted to the final assembly state E by guiding the connector 5 from the further preassembly state $V_2$ in the inserting direction I through the through-hole 5200 of the abutment 520 and then through the through opening 62 of the bushing body 6 into the borehole 531 of the base body 530, where the base thread 511 of the connector 5 is screwed into the internal thread 532 of the base body 530 until the holding surface 553 of the connector 5 lies against the shoulder 5203 of the abutment 520 and the contact surfaces 525, 534 of the abutment 520 and the base body 530 press against each other.

On the other hand, the dental implant 500 may be converted to the final assembly state E by introducing the connector 5 and the bushing body 6, joined together from the additional preassembly state $V_3$, into the dental implant 500 in the further additional preassembly state $V_4$ until they are received in the through-hole 5200 of the abutment 520 and the borehole 531 of the base body 530 and the base thread 511 of the connector 5 engages with the internal thread 532 of the base body 530, so that then by further screwing in of the connector 5 the holding surface 553 of the connector 5 is brought to bear against the shoulder 5203 of the abutment 520 and finally the contact surfaces 525, 534 of the abutment 520 and the base body 530 can be pressed against each other.

A further possibility of converting the dental implant 500 into the final assembly state E is to insert the connector 5, the abutment 520 and the bushing body 6 as a preassembled unit from the supplemental preassembly state $V_5$ in the inserting direction I into the base body 530. For example, the connector 5 is held in the through-hole 5200 of the abutment 520 and in the through opening 62 of the bushing body 6, able to rotate relative to the bushing body 6 and the abutment 520 about the center axis M, and thus it can be screwed by its base thread 511 into the internal thread 532 of the base body 530 until the contact surfaces 525, 534 of the abutment 520 and the base body 530 come to lie as flush as possible against each other.

In order to facilitate a screwing of the connector 5 into the base body 530, the connector is provided at its upper end or in the region of the holding element 55 with the engaging means 551. The engaging means 551 can be designed for example as a hexagon socket or a hexalobular socket and is accessible through the through-hole 5200 of the abutment 520 in the inserting direction I. The holding surface 553 is formed on the holding element 55. Resting against the shoulder 5203, the holding element 55 transmits onto the abutment 520 holding forces which act in the inserting direction I and, starting from the base thread 511 of the connector 5 engaging with the internal thread 532 of the base body 530, run substantially in the axial direction, i.e., in parallel to the center axis M, while the bushing body 6, embedded in sandwich fashion between the abutment 520 and the base body 530 on the one hand and the connector 5 on the other hand in the dental implant 500, helps to absorb any transverse forces and shear stresses deviating from the axial direction and thus to protect the ceramic components of the dental implant, namely the abutment 520 and the base body 530, against improper load distribution and any damage.

Furthermore, it is evident from FIG. 14 that the shoulder 5203 or at least one of a plurality of possible shoulders 5203 on which the holding surface 553 of the connector rests, can be configured alternatively or additionally on a further protrusion 5208a. The further protrusion 5208a is formed, preferably as a kind of counter positive-fit element complementary to the positive-fit elements 65 of the bushing body 6, at least in a projection along the inserting direction I, similar to that shown in FIG. 9. Thus, the further protrusion 5208a or a plurality of further protrusions 5208a arranged along the inner circumferential surface 5204 can each form a shoulder 5203 and be configured to create on the one hand a positive-fit between the abutment 520 and the bushing body 6, preventing relative movements between the abutment 520 and the bushing body 6 about the center axis M. On the other hand, an embodiment of the abutment 520 with further protrusions 5208a arranged virtually interrupted along the inner circumferential surface 5204 instead of one uninterrupted or continuous protrusion 5208 enables to introduce the connector 5 combined with the bushing body 6 in the preassembly state $V_3$ in accordance with FIG. 11 together through the abutment 520 into the base body 530, the positive-fit elements 65 being led through between the protrusions 5208a.

LIST OF REFERENCE SIGNS 1, 1', 1", 5 Unitary connector/connector
6 Bushing body
61 Shell section
62 Through opening
63 Inner circumferential surface
64 Outer circumferential surface
65 Positive-fit element
501 Outer section
6502 Inner section
66 Lower edge
67 Upper edge
68 Inserting bevel
69 Lug
6901 Latching element
11, 11', 11", 51 Base section
111, 111', 111", 511 Base thread/lower external thread
12, 12', 12", 52 Abutment holding portion
121, 121', 121" Holding thread/upper external thread
13, 13', 13", 53 Shaft segment
5301 Outer circumferential surface
54 Counter latching element/annular groove
5401 Annular flange
5402 Further annular flange
141 Bolt extension
14' Extension thread
100, 100' Dental implant
110 Tooth structure
1101 Recess
120, 120', 520 Abutment/prosthesis
1200, 1200', 5200 Through-hole
1201, 1201' Upper region of through-hole
1202 Lower region of through-hole
1203, 5203 Shoulder
5204 Inner circumferential surface
5205 Outer circumference
5206 Prosthesis thread
5207 Detent element
5208, 5208a Protrusion
5209 Limit stop
5210 Free space
124a, b Extension
125, 525 Contact surface
126, 526 Positive element
130, 530 Base body
131, 531 Borehole
5310 Inner circumferential surface
132, 532 Internal thread
133, 533 External thread
134, 534 Contact surface 135, 535 Receptacle
136, 536 Negative element
15, 15', 55 Holding element
151, 151', 551 Engaging means
152, 152' Internal thread
153, 553 Holding surface
16 Auxiliary holding element
161 Engaging means
E Final assembly state
I Inserting direction
$L_{11}$, $L_{11'}$ Length of base section
$L_{12}$, $L_{12'}$ Length of abutment holding portion
$L_{13}$, $L_{13'}$ Length of shaft segment
$L_{14'}$ Length of bolt extension
$L_{111}$, $L_{111'}$ Length of first external thread
$L_{112}$, $L_{112'}$ Length of abutment holding portion
$L_{132}$ Length of internal thread
$L_{141}$ Length of extension thread
M Center axis
R Radial direction
$V_1$ Preassembly state
$V_2$ Further preassembly state
$V_3$ Additional preassembly state
$V_4$ Further additional preassembly state
$V_5$ Supplemental preassembly state

The invention claimed is:

1. A dental implant comprising:
a ceramic abutment,
a connector for connecting the abutment to a base body, and
a bushing body, which in a final assembly state of the dental implant is received at least partly in the abutment, and which at least in sections surrounds the connector;
wherein the bushing body is provided with at least one latching element, which is configured to engage with a counter latching element formed on the connector in order to at least temporarily captively connect the bushing body and the connector to each other;
wherein the bushing body comprises at least one lug that protrudes from an edge of a shell section of the bushing body; and
wherein the at least one latching element is formed at an end of the at least one lug pointing away from the shell section and points in a radial direction of the dental implant toward a center axis of the dental implant.

2. The dental implant as claimed in claim 1, wherein the bushing body and/or the connector are made at least in sections from at least one of a metal, a metal alloy, a plastic, or a carbon fiber material.

3. The dental implant as claimed in claim 1, wherein the bushing body in the final assembly state engages at least partly in the base body and the abutment.

4. The dental implant as claimed in claim 1, wherein the bushing body in the final assembly state protrudes beyond a contact surface formed on the base body, which is configured to rest against a contact surface of the abutment in the final assembly state.

5. The dental implant as claimed in claim 1, wherein in the final assembly state the abutment rests against the bushing body.

6. The dental implant as claimed in claim 1, wherein the bushing body has a cylindrical inner circumferential surface.

7. The dental implant as claimed in claim 1, wherein one inner diameter of the bushing body corresponds to an outer diameter of at least one shaft segment of the connector.

8. The dental implant as claimed in claim 1, wherein at least one positive-fit element is formed on an outer circumferential surface of the bushing body.

9. The dental implant as claimed in claim 8, wherein the at least one positive-fit element comprises an inserting bevel facing in an inserting direction, in which the bushing body can be inserted into the abutment.

10. The dental implant as claimed in claim 1, wherein at least one positive element of the abutment is configured to interact in positive-fit with the bushing body.

11. The dental implant as claimed in claim 1, wherein at least one negative element of the base body is configured to interact in positive-fit with the abutment and/or the bushing body.

12. The dental implant as claimed in claim 1, wherein a minimal inner width of a portion of the bushing body is smaller than an outer diameter of a portion of the connector for screwing the connector into the base body.

13. The dental implant as claimed in claim 1, wherein the connector is inserted in a through-hole of the abutment, and the at least one latching element of the bushing body is in engagement with the counter latching element of the connector.

14. The dental implant as claimed in claim 1, wherein the counter latching element formed on the connector has a shape of an annular groove.

15. The dental implant as claimed in claim 1, wherein the base body is a ceramic base body.

16. The dental implant as claimed in claim 1, wherein the bushing body in the final assembly state is received at least partly in the base body.

17. The dental implant as claimed in claim 1, wherein in the final assembly state the abutment rests against the base body.

18. The dental implant as claimed in claim 1, wherein at least one positive-fit element is formed on an outer circumferential surface of the bushing body, and wherein the at least one positive-fit element comprises an inserting bevel facing in an inserting direction, in which the bushing body can be inserted into the base body.

19. The dental implant as claimed in claim 1, wherein at least one positive element of the abutment is configured to interact in positive-fit with the base body.

20. The dental implant as claimed in claim 1, wherein the dental implant comprises a ceramic tooth structure.

* * * * *